United States Patent [19]

Shiraishi et al.

[11] Patent Number: 5,739,826
[45] Date of Patent: Apr. 14, 1998

[54] POLYGON DISPLAY BASED ON X COORDINATES OF EDGES ON SCAN LINE

[75] Inventors: Naoto Shiraishi, Toyonaka; Tatsuya Fujii, Nishinomiya; Masanobu Fukushima; Tatsuya Nakajima, both of Toyonaka; Yasuhiro Izawa, Suita, all of Japan

[73] Assignee: Ricoh Company, Ltd.

[21] Appl. No.: 643,409

[22] Filed: May 6, 1996

Related U.S. Application Data

[63] Continuation of Ser. No. 102,050, Aug. 4, 1993, abandoned.

[30] Foreign Application Priority Data

Aug. 8, 1992 [JP] Japan ................... 4-232995

[51] Int. Cl.$^6$ .................................................. G06T 11/20
[52] U.S. Cl. ............................................................. 345/443
[58] Field of Search ................................. 395/118, 135, 395/134, 141, 143, 443

[56] References Cited

U.S. PATENT DOCUMENTS

| | | | |
|---|---|---|---|
| 4,897,805 | 1/1990 | Wang | 395/129 |
| 4,962,468 | 10/1990 | Beauregard | 395/129 |
| 4,972,330 | 11/1990 | Matsushiro et al. | 395/134 |
| 5,065,342 | 11/1991 | Ito et al. | 395/134 |
| 5,115,402 | 5/1992 | Matsushiro et al. | 395/141 |
| 5,117,485 | 5/1992 | Malachowsky et al. | 395/134 |
| 5,123,085 | 6/1992 | Wells et al. | 395/143 X |
| 5,129,051 | 7/1992 | Cain | 395/141 X |
| 5,159,665 | 10/1992 | Priem et al. | 395/143 X |
| 5,214,753 | 5/1993 | Lee et al. | 395/125 |
| 5,216,516 | 6/1993 | Tanaka et al. | 358/426 |
| 5,276,783 | 1/1994 | Fossum | 395/123 |
| 5,287,436 | 2/1994 | Fischer et al. | 395/119 |
| 5,319,346 | 6/1994 | Harrington | 395/141 X |
| 5,341,468 | 8/1994 | Shiraishi et al. | 395/132 |
| 5,343,558 | 8/1994 | Akely | 395/126 |
| 5,347,618 | 9/1994 | Akely | 395/121 |
| 5,347,619 | 9/1994 | Erb | 395/141 X |
| 5,353,394 | 10/1994 | Kubota | 395/141 |
| 5,386,502 | 1/1995 | Minagawa et al. | 395/141 |
| 5,396,586 | 3/1995 | Van Aken | 395/141 |
| 5,402,532 | 3/1995 | Epstein et al. | 395/122 |

FOREIGN PATENT DOCUMENTS 62-231379 10/1987 Japan.
3-26914 12/1991 Japan.

OTHER PUBLICATIONS

Foley et al., Computer Graphics: Principles and Practice, 1990, pp. 92–95, 680–685.

*Primary Examiner*—Anton Fetting
*Attorney, Agent, or Firm*—Woodcock Washburn Kurtz Mackiewicz & Norris LLP

[57] ABSTRACT

Image data is processed so that polygons can be displayed on a screen of scanned lines. A first memory stores at least X and Y coordinate data for edge points of the polygons. A second memory stores polygon numbers arranged in a processing order. A first computing unit computes data for sides of each polygon corresponding to each polygon number stored in the second memory. A second computing unit computes edge pair data in accordance with the data for sides of polygons, the edge pair data including a pair of edge points located on the scan lines. A third computing unit computes data for a start point and an end point of each polygon based on the edge pair data. Finally, a processing unit processes the start point and end point data to obtain polygon dot data and outputs the dot data in synchrony with the scan lines.

16 Claims, 33 Drawing Sheets

FIG. 11A    LEFT SIDE COUNTER    RIGHT SIDE COUNTER 1                1

EDGE PAIR
L  R
2—4

FIG. 11B    LEFT SIDE COUNTER    RIGHT SIDE COUNTER 1                2

EDGE PAIR
L  R
2—1
2—4

FIG. 11C    LEFE SIDE COUNTER    RIGHT SIDE COUNTER 2                1

EDGE PAIR
L  R
1—4
2—4

FIG. 11D    LEFE SIDE COUNTER    RIGHT SIDE COUNTER 1                3

EDGE PAIR
L  R
2—1
2—4
2—3

FIG. 11E    LEFE SIDE COUNTER    RIGHT SIDE COUNTER 3                1

EDGE PAIR
L  R
1—4
2—4
3—4

FIG. 11F    LEFE SIDE COUNTER    RIGHT SIDE COUNTER 2                2

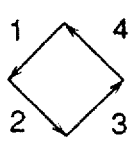

EDGE PAIR
L  R
1—4
2—3

FIG. 11G    LEFE SIDE COUNTER    RIGHT SIDE COUNTER 2                2

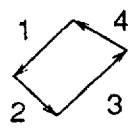

EDGE PAIR
L  R
1—4
1—3
2—3

FIG. 11H    LEFE SIDE COUNTER    RIGHT SIDE COUNTER 2                2

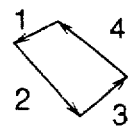

EDGE PAIR
L  R
1—4
2—4
2—3

F I G. 1 4 A
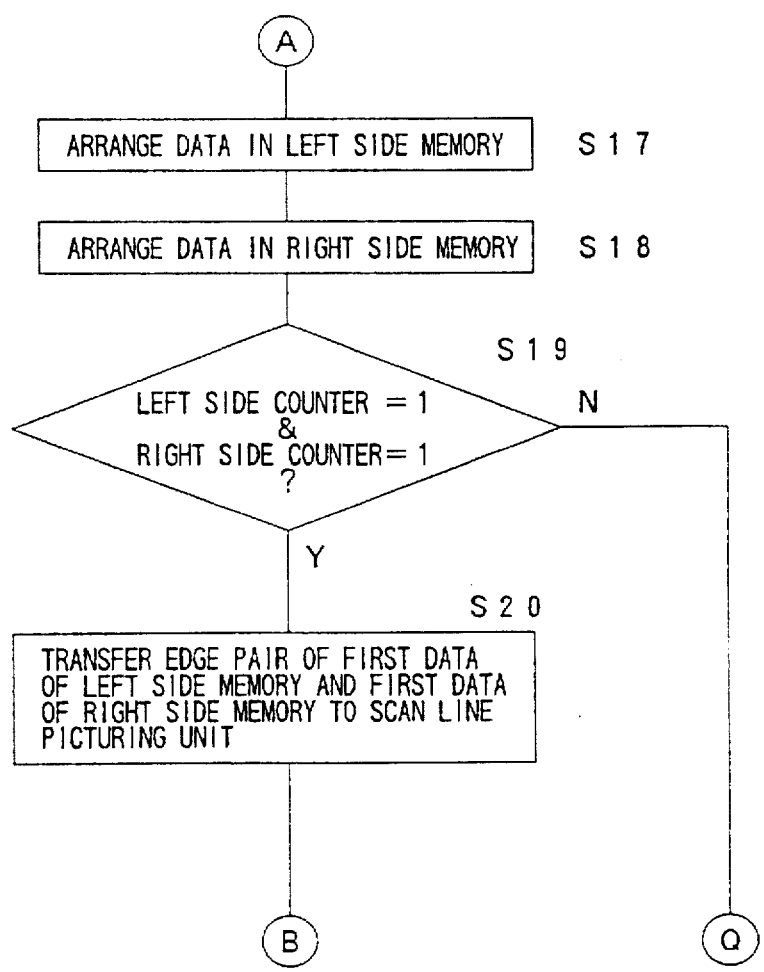

F I G. 1 5 A
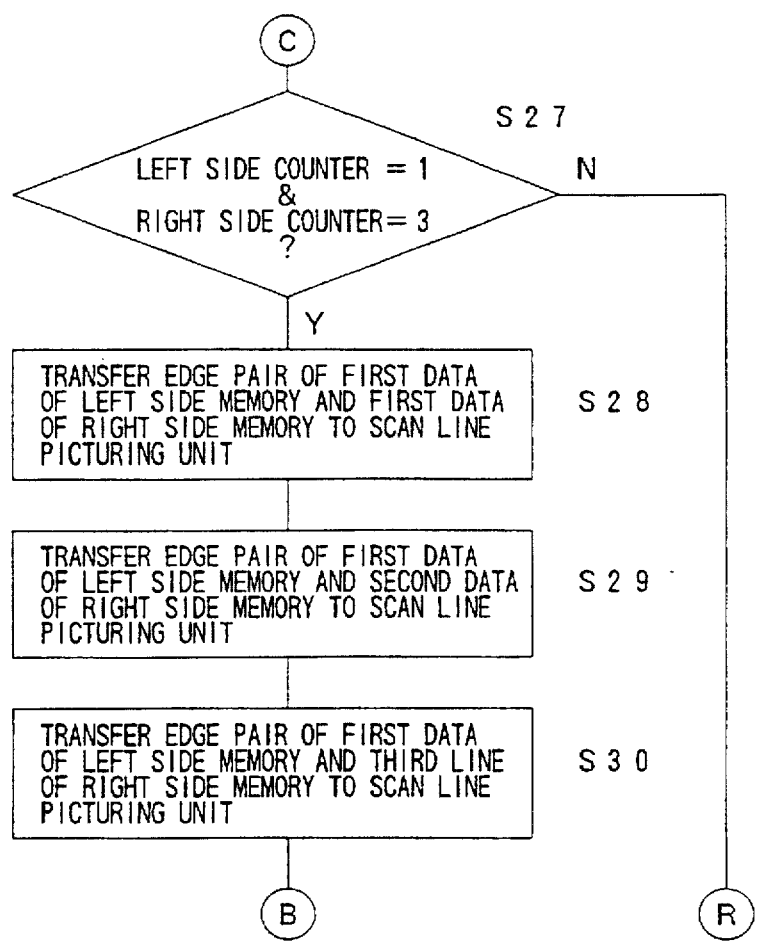

F I G. 1 5 B
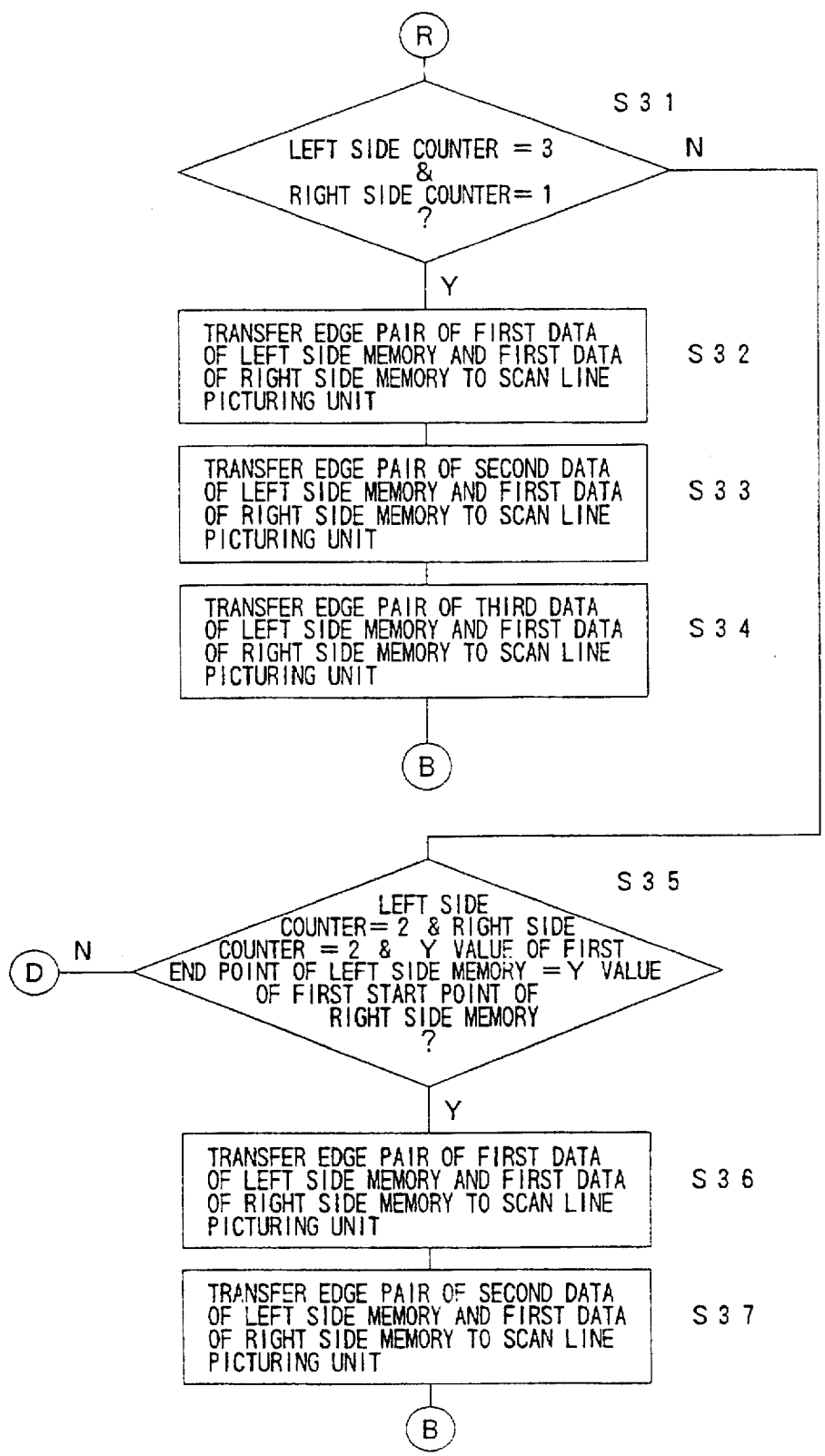

FIG. 26A

| | EDGE | SCREEN X COORDINATE | SCREEN Y COORDINATE | COLOR |
|---|---|---|---|---|
| POLYGON 1 | EDGE 1 | 5 | 2 | BLUE |
| | EDGE 2 | 1 | 3 | |
| | EDGE 3 | 2 | 11 | |
| | EDGE 4 | 7 | 10 | |
| POLYGON 2 | EDGE 1 | 7 | 2 | RED |
| | EDGE 2 | 2 | 7 | |
| | EDGE 3 | 11 | 11 | |
| | EDGE 4 | 12 | 5 | |
| POLYGON 3 | EDGE 1 | 4 | 6 | YELLOW |
| | EDGE 2 | 4 | 7 | |
| | EDGE 3 | 8 | 7 | |
| | EDGE 4 | 8 | 6 | |

FIG. 26B

| SORT ADDRESS | POLYGON ADDRESS |
|---|---|
| 1 | 1 |
| 2 | 5 |
| 3 | 9 |

FIG. 27A

| Y ADDRESS | 1 | | 2 | | 3 | |
|---|---|---|---|---|---|---|
| | LEFT INTERSECTION | RIGHT INTERSECTION | LEFT INTERSECTION | RIGHT INTERSECTION | LEFT INTERSECTION | RIGHT INTERSECTION |
| 0 | | | | | | |
| 1 | | | | | | |
| 2 | 5 | 5 | 7 | 7 | | |
| 3 | 1 | 5 | 6 | 9 | | |
| 4 | 1 | 5 | 5 | 10 | | |
| 5 | 1 | 6 | 4 | 12 | | |
| 6 | 1 | 6 | 3 | 12 | 4 | 8 |
| 7 | 1 | 6 | 2 | 12 | 4 | 8 |
| 8 | 2 | 7 | 4 | 11 | | |
| 9 | 2 | 7 | 7 | 11 | | |
| 10 | 2 | 7 | 9 | 11 | | |
| 11 | 2 | 2 | 11 | 11 | | |
| 12 | | | | | | |

FIG. 27B

| Y ADDRESS | 1 | | 2 | |
|---|---|---|---|---|
| | LEFT INTERSECTION | RIGHT INTERSECTION | LEFT INTERSECTION | RIGHT INTERSECTION |
| 0 | | | | |
| 1 | | | | |
| 2 | 5 | 5 | 7 | 7 |
| 3 | 1 | 5 | 6 | 9 |
| 4 | 1 | 5 | 5 | 10 |
| 5 | 1 | 6 | 4 | 12 |
| 6 | 1 | 6 | 3 | 12 |
| 7 | 2 | 6 | 2 | 12 |
| 8 | 2 | 7 | 4 | 11 |
| 9 | 2 | 7 | 7 | 11 |
| 10 | 2 | 7 | 9 | 11 |
| 11 | | 2 | 11 | 11 |
| 12 | | | | |

FIG. 28

| Y ADDRESS | 1 | | 2 | | 3 | | ... | 255 | | 256 | |
|---|---|---|---|---|---|---|---|---|---|---|---|
| | LEFT INTERSECTION X ADDRESS | RIGHT INTERSECTION X ADDRESS | LEFT INTERSECTION X ADDRESS | RIGHT INTERSECTION X ADDRESS | LEFT INTERSECTION X ADDRESS | RIGHT INTERSECTION X ADDRESS | | LEFT INTERSECTION X ADDRESS | RIGHT INTERSECTION X ADDRESS | LEFT INTERSECTION X ADDRESS | RIGHT INTERSECTION X ADDRESS |
| 0 | | | | | | | | | | | |
| 1 | | | | | | | | | | | |
| 2 | | | | | | | | | | | |
| 3 | | | | | | | | | | | |
| 4 | | | | | | | | | | | |
| 5 | | | | | | | | | | | |
| 6 | | | | | | | | | | | |
| 7 | | | | | | | | | | | |
| 8 | | | | | | | | | | | |
| 9 | | | | | | | | | | | |
| 10 | | | | | | | | | | | |
| ...... | | | | | | | | | | | |
| 400 | | | | | | | | | | | |

| Y ADDRESS | NUMBER OF POLYGONS |
|---|---|
| 1 | |
| 2 | |
| 3 | |
| 4 | |
| 5 | |
| 6 | |
| 7 | |
| 8 | |
| ⋮ | |
| 400 | |

XS=3   XE=22
0 1 2 3 4 5 6 7 8 9 10 11 12 13 14 15 16 17 18 19 20 21 22 23 24 25 26 27 28 29 30 31

1DOT

2DOT

4DOT 1  2  3  4

①~③ POLYGONS TO BE DISPLAYED

④~⑥ POLYGONS NOT TO BE DISPLAYED

POLYGON DISPLAY BASED ON X COORDINATES OF EDGES ON SCAN LINE

This is a continuation of application Ser. No. 08/102,050, filed Aug. 4, 1993 and now abandoned.

BACKGROUND OF THE INVENTION

The present invention relates to an image processing apparatus, and more specifically to an image processing apparatus for generating three-dimensional computer graphics used in work stations or game machines and outputting image signals in accordance with image information of a polygon in realtime.

An image processing apparatus described herein is an apparatus which can output image signals to a display apparatus such as a CRT display in accordance with input from external devices. Such an image processing apparatus can output not only image signals for a two-dimensional image but also image signals for a pseudo three-dimensional image by synthesizing two dimensional image signals. Therefore, such an image processing apparatus is widely used in TV game machines or computer graphics apparatuses in which a three-dimensional image display is adopted.

A conventional image processing apparatus of this kind uses a bit map display method (graphic display). In order to use a bit map display method, a bit map memory having memory areas is provided, and each of the memory areas stores all pixel signals which constitute an entire single image to be displayed on a CRT. When a picture is displayed in, for example, computer graphics, a contour of a polygon is drawn on a display, and then the inside of the polygon is painted. Accordingly, there is a problem in increasing the number of polygons, since a memory having a large capacity is required and a realtime image processing can not perform.

Japanese Laid-Open Patent Application No. 62-231379 discloses a picture synthesizing apparatus in which image signals are synthesized and output in realtime in accordance with supplied contour line information of a picture. In a field processor of the above-mentioned picture synthesizing apparatus, since one polygon is processed at a time by means of digital differential analysis, a X start point and a X end point on a scan line cannot be determined until the picture processing of the polygon has been completed. Therefore, it is difficult to provide, when a plurality of polygons is overlapped each other, a so called hidden plane processing unit in which a process for distinguishing between polygons to be displayed and polygons not to be displayed is performed. In an example of such a process as shown in FIG. 34, polygons 1-3 are to be displayed, but polygons 4-6 are not to be displayed. If the hidden plane processing unit is not provided, such a classification cannot be achieved.

Additionally, in a polygon scan conversion algorithm, a scan line is obtained in processing of a polygon. In this algorithm, all intersections of a contour line of a polygon and each Y coordinate (scan line) are obtained. After sorting the intersections on the scan lines in a direction along the X coordinates is completed, intersection pairs of the polygon are obtained, and then the polygon is drawn and painted, so that the algorithm can be applied to a polygon having a recessed portion. Accordingly, this algorithm requires an intermediate buffer which can store all the intersections to obtain intersection pairs. Additionally, this algorithm requires a process for accessing the intermediate buffer and for sorting the intersections along the scan line.

Japanese Laid-Open Patent Application No. 3-26914 discloses another image processing apparatus. This image processing apparatus includes a hidden plane processing unit between a frame memory and a mapping processing unit which processes internal pattern information in accordance with a shape of a polygon. The hidden plane processing unit distinguishes between polygons to be displayed and polygons not to be displayed among a plurality of overlapped polygons. In this image forming apparatus, it is determined whether or not a pair of intersections with regard to a X start point and a X end point of a polygon along a scan line is to be displayed. The mapping processing unit has read out these intersection. If there is at least one intersection pair to be displayed, a signal representing that the intersection pair is to be displayed is sent to the mapping processing unit. On the other hand, if there is an intersection pair which is not to be displayed, another signal representing that the intersection pair is not to be displayed is sent to the mapping processing unit. In this case, signals corresponding to intersection pairs of a polygon on a scan line are sent by a field processor, and a number of the signals is limited by the number of accesses which can be performed during a process time for one scan line. Thus a large memory capacity and a fast memory access speed are required.

SUMMARY OF THE INVENTION

It is a general object of the present invention to provide a novel and useful image processing apparatus in which the above-mentioned disadvantages are substantially eliminated.

A more specific object of the present invention is to provide an image processing apparatus which can be operated with a small memory capacity and at a high speed.

In order to achieve the above-mentioned objects, n image processing apparatus according to the present invention processes image data of a picture consisting of polygons to be displayed on a screen having scan lines of a display unit, the image processing apparatus including:

a first memory for storing at least X and Y coordinate data for edge points of the polygons;

a second memory for storing polygon numbers indicative of an order of priority in which the polygon having the highest priority is arranged first in the order;

a first computing unit connected to the first memory and the second memory for computing data for sides of each of the polygons corresponding to each of the polygon numbers stored in the second memory based upon the data for edge points stored in the first memory;

a second computing unit for computing edge pair data in accordance with the data for sides of polygons supplied by the first computing unit, the edge pair data including data of a pair of edge points located on the scan lines of the screen;

a third computing unit for computing data for a start point and an end point of each of the polygons in accordance with the edge pair supplied by the second computing unit; and a processing unit for processing the data for a start point and an end point supplied by the third computing unit so as to obtain dot data for the polygons, and for outputting the dot data for the polygons, and for outputting the dot data of the polygons by synchronizing with scan lines of the screen on a display unit.

Further, an image processing apparatus according to the present invention processes image data of a picture consisting of polygons to be displayed on a screen having scan lines of a display unit, the image processing apparatus including:

a first memory for storing at least X and Y coordinate data for edge points of the polygons;

a second memory for storing polygon numbers indicative of an order of priority in which the polygon having highest priority is arranged first in the order;

a first computing unit connected to the first memory and the second memory for computing data for sides of each of the polygons corresponding to each of the polygon numbers stored in the second memory based upon the data for edge points stored in the first memory;

a second computing unit for computing edge pair data in accordance with the data for sides of polygons supplied by the first computing unit, the edge pair data including data of a pair of edge points located on the scan lines of the screen;

a third computing unit for computing data for a start point and an end point of each of the polygons in accordance with the edge pair data supplied by the second computing unit;

a hidden plane processing unit for generating dot data for each side of the polygon in accordance with the data for a start point and an end point of each of the polygons, and for processing the data for a start point and an end point with respect to an X coordinate value of the start point and an X coordinate value of the end point so as to determine whether or not each of the polygons is to be displayed;

a third memory for storing data for polygons to be displayed; and an outputting unit for outputting the dot data of the polygons supplied by the third memory by synchronizing the dot data with the scan lines of the screen on the display unit.

According to the present invention, since only data for a polygon which is to be displayed or may be displayed is stored in the memory, a memory having a small capacity can be adopted. Additionally, there is no unnecessary data in the memory, and thus any unnecessary computation is eliminated which results in a reduced processing time.

Other objects, features and advantages of the present invention will become more apparent from the following detailed description when read in conjunction with the accompanying drawings.

BRIEF DESCRIPTION OF THE PREFERRED EMBODIMENTS

FIGS. 11A–11H are illustrations showing a relationship between edge pairs to be calculated and the count value of a left side counter and that of a right side counter in the scan line picturing unit;

FIGS. 14A and 14B are parts of the flow chart for explaining the operation of the picture processing unit;

FIGS. 15A and 15B are parts of the flow chart for explaining the operation of the picture processing unit;

FIG. 20A showing an output from a dot circuit; and FIG. 20B showing an operation of a flag RAM;

FIG. 26A is an illustration of a screen memory shown in FIG. 1; and FIG. 26B is an illustration of a sort memory shown in FIG. 1;

FIGS. 27A and 27B are illustrations of a frame memory shown in FIG. 1; FIG. 27A showing a case where a hidden plane processing is not performed; and FIG. 27B showing a case where a hidden plane processing according to the present invention is performed;

FIG. 28 is an illustration showing an example of a format of a frame memory shown in FIG. 1;

FIG. 33A showing a state before a clipping is performed; and FIG. 33B showing a state after a clipping has been performed;

DETAILED DESCRIPTION OF THE PREFERRED EMBODIMENTS

A description will now be given, with reference to the drawings, of an embodiment of an image processing apparatus according to the present invention.

Figure 1:
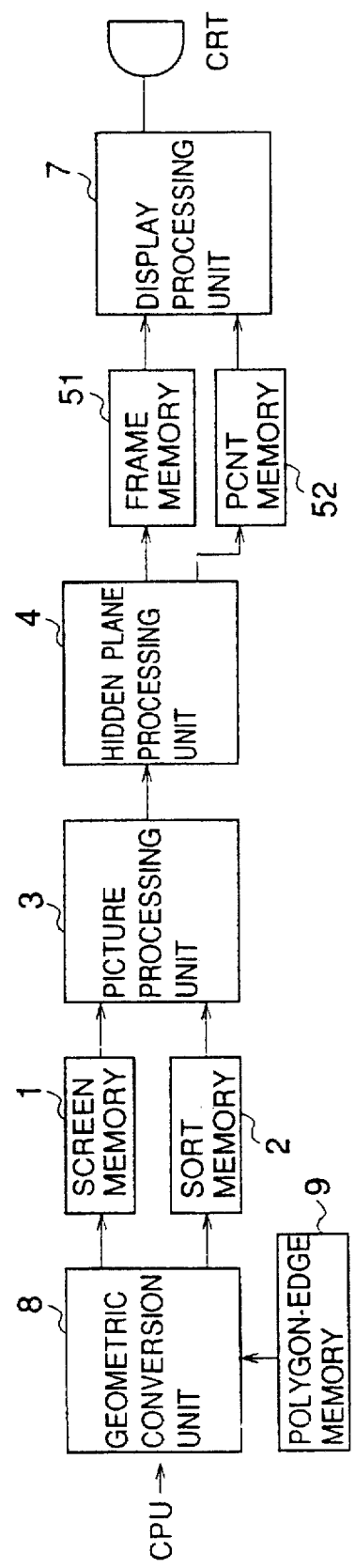
FIG. 1 is a block diagram of a three-dimensional image processing apparatus according to the present invention.

FIG. 1 is a block diagram of a three-dimensional image processing apparatus according to the present invention. This apparatus is suitable for game machines such as a racing game or a flight simulator.

In the image processing apparatus shown in FIG. 1, simulation picture information is supplied to a CPU of a game machine is stored in a polygon edge memory 9 as information of a plurality of polygons. The CPU converts a shape of any object into an assembly of a plurality of polygons. The CPU then reads out relevant data from a world memory (not shown in the figure) in which edge information of the polygons and that of a mapping memory provided with patterns and color information are stored. The CPU then computes condition data in accordance with electric signals input by an operational unit of the game machine, and the operational unit includes a control unit such as a controller which is operated by a player of the game machine (not shown in the figure), and then supplies the condition data to a geometric conversion unit 8.

The geometric conversion unit 8 then reads out relevant data from the polygon edge memory 9 with reference to the polygon data stored in the world memory in accordance with a command sent by the CPU. Coordinate values of edge points of each polygon are then geometrically converted by a sight conversion method or a perspective projection conversion method, and their X-Y two-dimensional coordinates are stored in a screen memory 1. Additionally, a sight converted value representative of the center of each of the polygons is a Z value indicative of a distance from a view point. This Z value is determined, and then the representative values are arranged so that a polygon having a representative value small than another value of a polygon has a higher priority than the other polygons. A polygon number is supplied to a sort memory 2.

Edge point information of each of the polygons is computed into a two-dimensional coordinates as shown in FIG. 26A, and is stored in the screen memory 1. The screen memory 1 includes additional data such as color information on R, G and B respectively corresponding to each of the polygon edge points.

Data in the sort memory 2 is, as shown in FIG. 26B, sorted in accordance with the priority (Z value) so that polygon addresses are stored in an order starting from the highest Z value. A picture processing unit 3 reads out polygon edge information from the screen memory 1 in accordance with the order of priority of polygons stored in the sort memory 2, and then computes an X start point and an X end point for every scan line from a Y start point to a Y end point (Y address). The computed data of the X start point and the X end point is then transferred to a hidden plane processing unit 4.

Figures 30, 31:
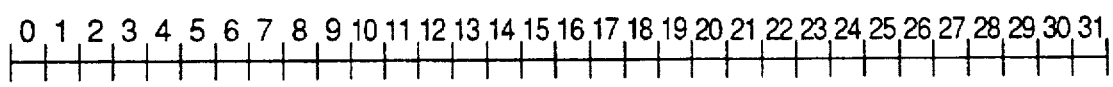
FIG. 30 is an illustration showing an example of a format of a PCNT memory shown in FIG. 1.
FIG. 31 is an illustration showing an example of output from a dot circuit in a hidden plane processing unit shown in FIG. 1.

The hidden plane processing unit 4 determines whether or not the polygon is to be displayed in accordance with an intersection pair on the scan lien received from the picture processing unit 3. The intersection pair includes an X start point (left intersection) and an X end point (right intersection). The hidden plane processing unit 4 then writes the polygon data to be displayed into a frame memory 51, and supplies data to a polygon number count memory (PCNT memory) 52 which stores the number of polygons. The frame memory 51 is formatted as shown in FIG. 28, and stores an X start point and an X end point of the polygon to be displayed. The PCNT memory 52 is formatted as shown in FIG. 30, and stores the number of polygons on each scan line (Y address). The frame memory 51 and the PCNT memory 52 send data to a display processing unit 7, and the display processing unit 7 outputs polygon data as a form of dot data by synchronizing the dot data with scan lines of a CRT 10.

Figure 2:
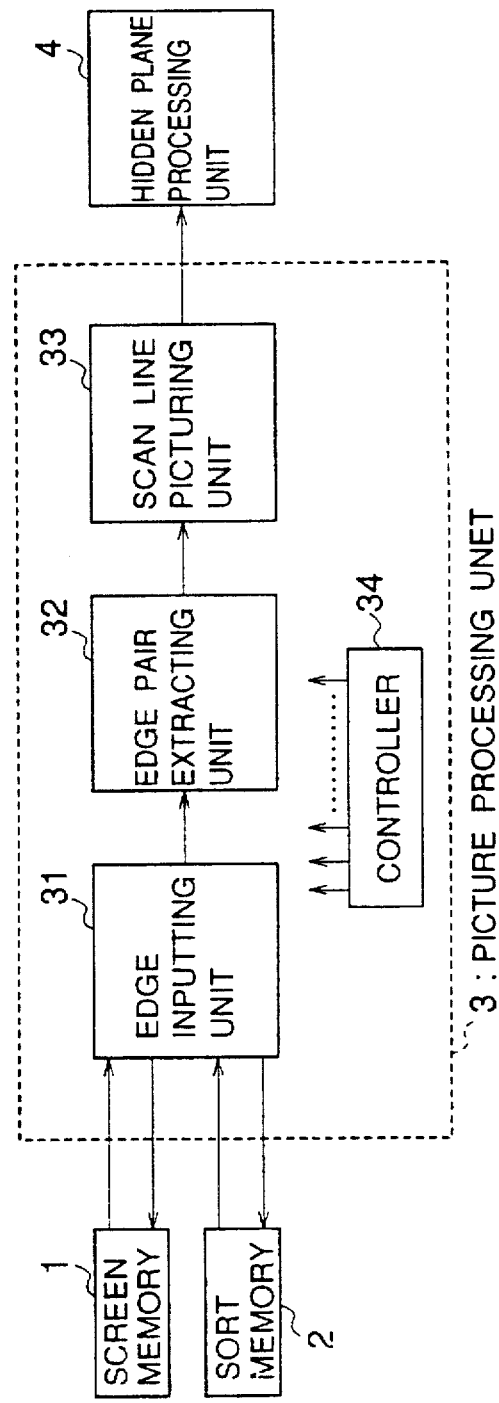
FIG. 2 is a block diagram of a picture processing unit shown in FIG. 1.

A description will now be given, with reference to FIG. 2, of the picture processing unit 3 which is an essential part of the present invention. The edge inputting unit 31 reads out from the screen memory 1 data of the edge point of the polygon which correspond to that in the sort memory 2. The data of the edge point is subjected to a simple clipping process, and then polygon edge information corresponding to each side of the polygon is transferred to an edge pair extracting unit 32.

The edge pair extracting unit 32 computes an edge pair on a scan line based on information of a side of the polygon which is supplied by the edge inputting unit 31. The edge pair information is then transferred to a scan line picturing unit 33.

The scan line picturing unit 33 computes, by a scan line computation, a X start point (XS) and a X end point (XE) on a scan line between two sides of a polygon in accordance with the edge pair received from the edge pair extracting unit 32, and then the resultant data is transferred to the hidden plane processing unit 4.

The edge inputting unit 31, the edge pair extracting unit 32 and the scan line picturing unit 33 are controlled by a controller 34. An operation of the controller will now be described with reference to a flow chart as shown in FIGS. 13A through 18.

Figure 3:
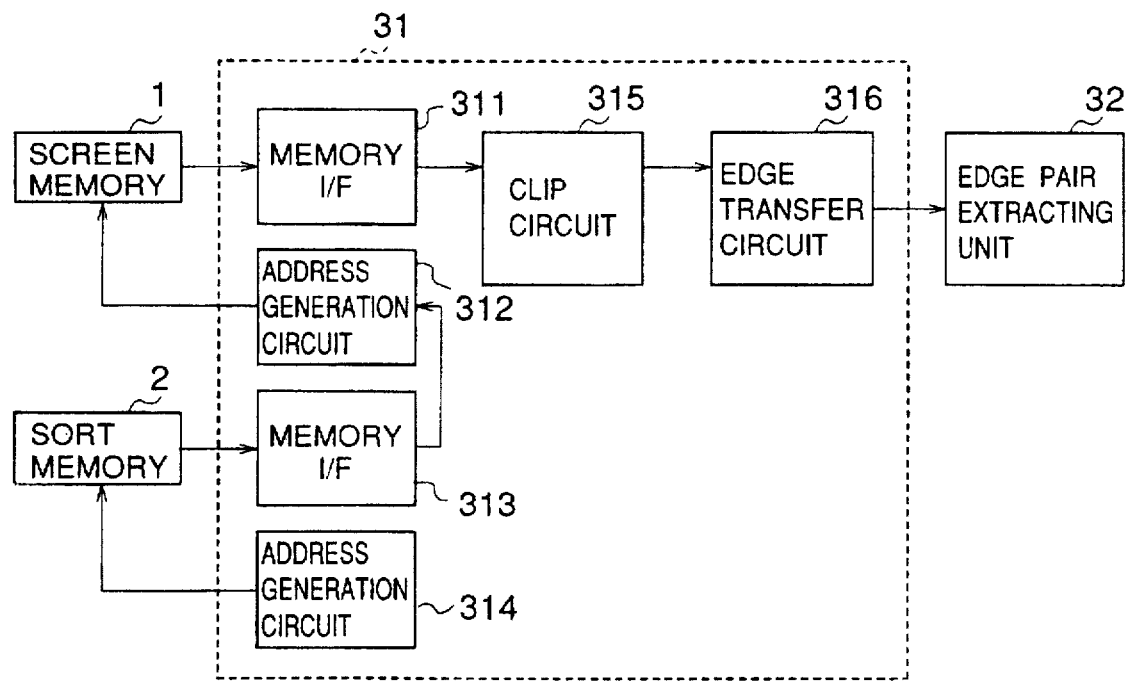
FIG. 3 is a block diagram of an edge inputting circuit shown in FIG. 2.

A description of a process performed by the edge inputting unit 31 will now be given with reference to FIG. 3 which shows a specific structure of the edge inputting unit 31.

Data sent by the screen memory 1 is supplied to a memory interface (I/F) 311 of the edge inputting unit 31, and the data is temporarily stored in the memory I/F 311. The screen memory 1 is accessed in accordance with an address generated by an address generation circuit 312. The address generation circuit 312 is provided with the data which has been temporarily stored in the memory I/F 313, and an address for the screen memory 1 is generated in accordance with the data from the sort memory 2.

The sort memory 2 is accessed according to the address generated by an address generation circuit 314. The edge point data of the polygon which has been supplied by the address generation circuit 314 is then supplied to a clip circuit 315.

Figure 9:
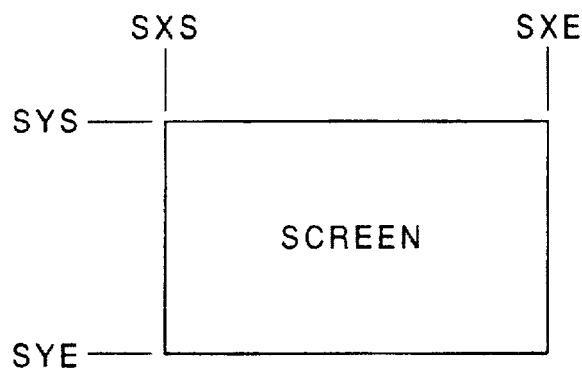
FIG. 9 is an illustration showing a screen used by the image processing apparatus shown in FIG. 1.
Figure 10:
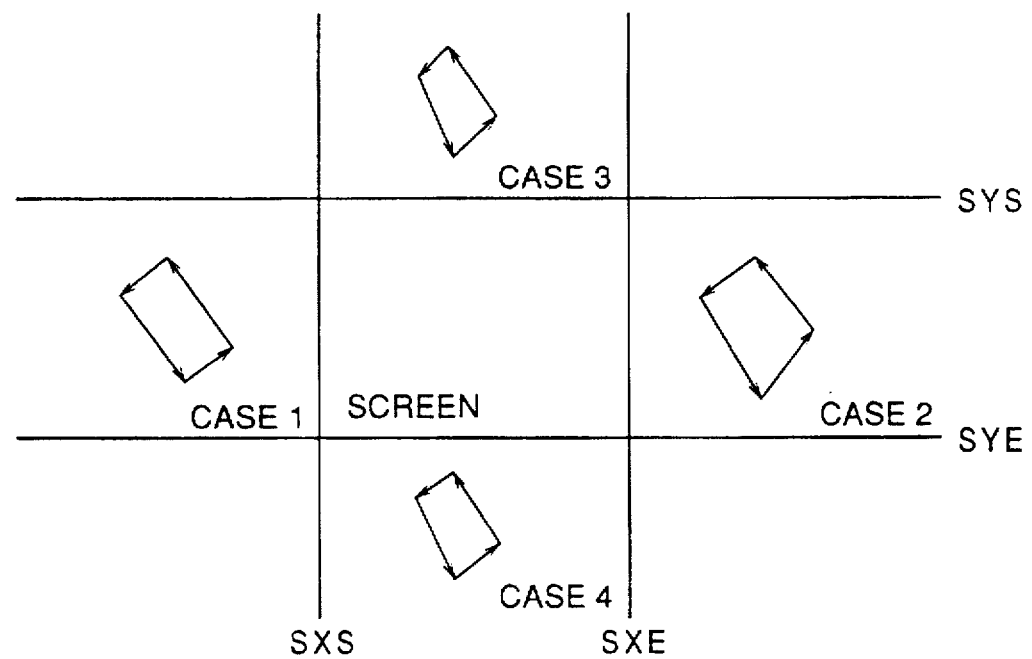
FIG. 10 is an illustration showing examples of polygons which are to be deleted by a clipping process.

The clip circuit 315 compares the edge point data with values of a X start point (SXS), a X end point (SXE), a Y start point (SYS) and a Y end point (SYE) on the screen as shown in FIG. 9 so as to eliminate the polygons corresponding to cases 1 to 4 as shown in FIG. 10. That is, polygons which are not located in the screen are eliminated. As a result, only the polygon data which corresponds to polygons located on the screen is processed.

The polygon edge point data which was not eliminated by the clip circuit 315 is supplied to an edge transfer circuit 316. The edge transfer circuit 316 converts the remaining polygon data into a format in accordance with a start point and an end point of each side of a polygon, and then the polygon data is transferred to an edge pair extracting unit 32.

Figure 4:
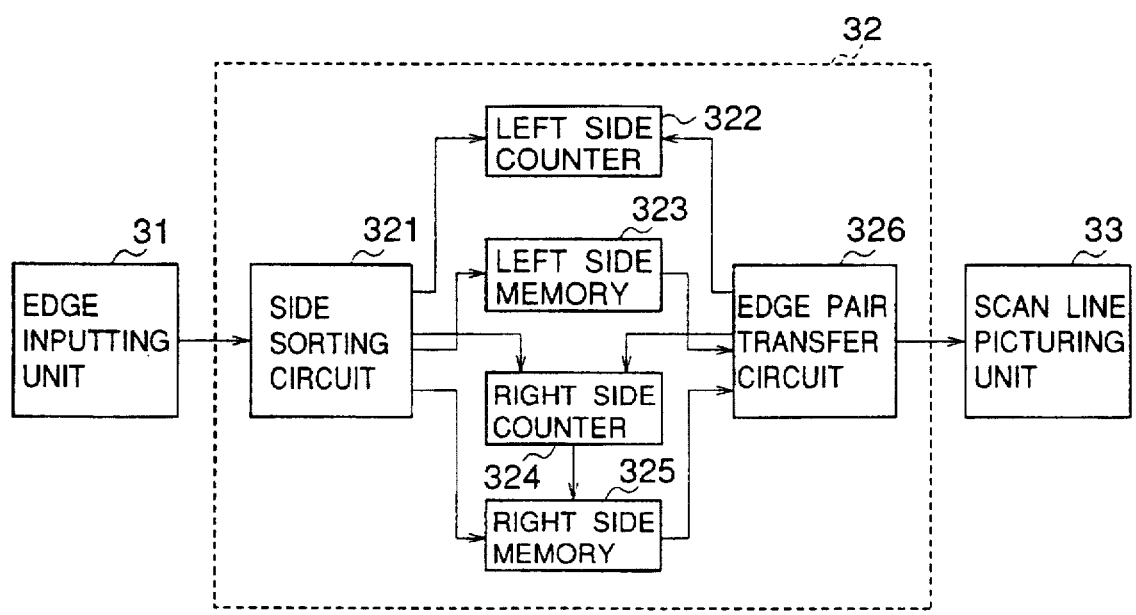
FIG. 4 is a block diagram of an edge-pair extracting circuit shown in FIG. 2.
Figure 32:
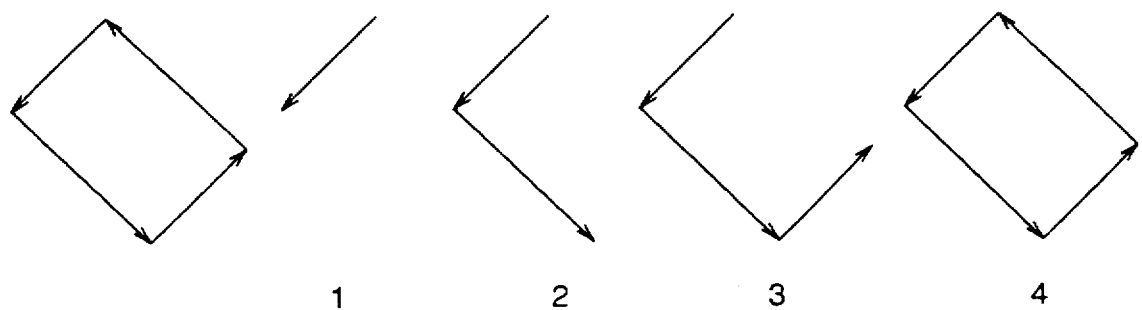
FIG. 32 is an illustration showing a vector direction of a polygon.
Figure 33A:
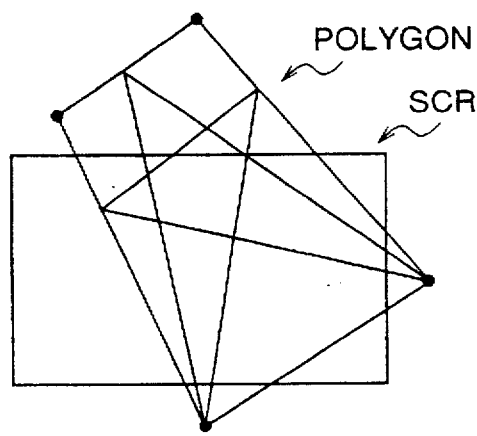
FIGS. 33A and 33B are illustrations showing an example of a clipping.
Figure 33B:
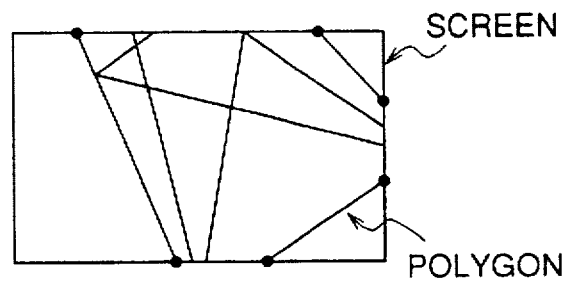
Figure 34:
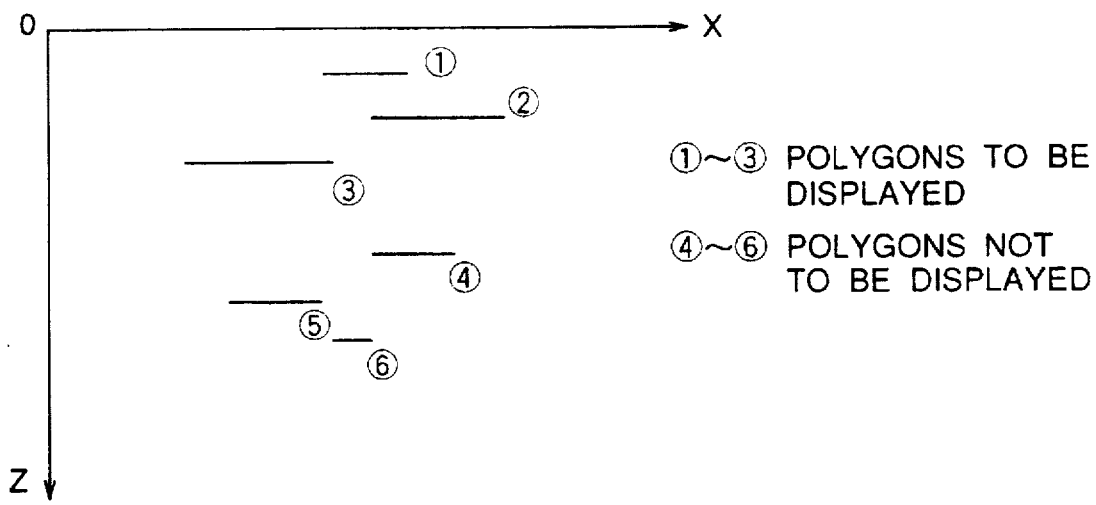
FIG. 34 is an illustration showing a relationship between polygons in a Z direction.
Figure 35:
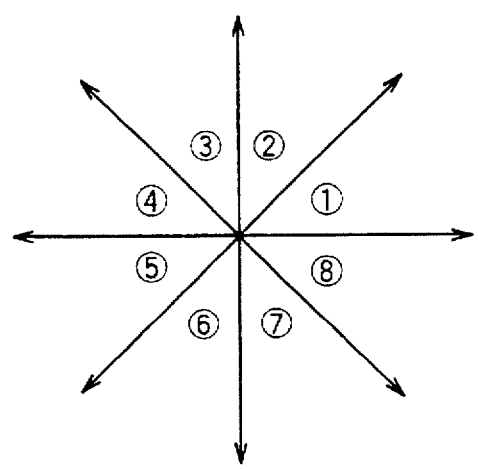
FIG. 35 is an illustration showing regions of line vectors.

A description of a process performed by the edge pair extracting unit 32 will now be given with reference to FIG. 4. The data for start and end points of a side of the polygon supplied by the edge inputting unit 31 is input to a side sorting circuit 321 of the edge pair circuit 32. In the side sorting circuit 321, a lien vector is computed in accordance with the start point (XS,YS) and the end point (SE,YE) of the side of the polygon so as to determine a direction of the line vector of the side from among the directions shown in FIG. 3S. If the polygon corresponds to a counterclockwise polygon which is shown in FIG. 32, sides which have line vectors corresponding to directions 1 to 4 are determined to be a right side of the polygon and sides which have line vectors corresponding to directions 5 to 8 are determined to be a left side of the polygon as indicated in FIG. 3S. If the polygon corresponds to a clockwise polygon which is reverse of that shown in FIG. 32, sides which have line vectors corresponding to directions 1 to 4 are determined to be a right side of the polygon and sides which have line vectors corresponding to directions 5 to 8 are determined to a left side of the polygon.

When a side is determined to be a left side of the polygon, a left side counter 322 is incremented, and side information is stored in a left side memory 323. When a side is determined to be a right side of the polygon, a right side counter 324 is incremented, and side information is stored in a right side memory 325.

The side information is stored in the left side memory 323 and the right side memory 325 and it is arranged by a Y value (a scan line number). A value of an edge pair corresponding to each polygon is computed based on the counter numbers of the left side counter 322 and the right side counter 324 as shown in FIGS. 11A to 11H. The edge pair data is then transferred to a scan line picturing unit via an edge pair transfer circuit 326.

Figure 5:
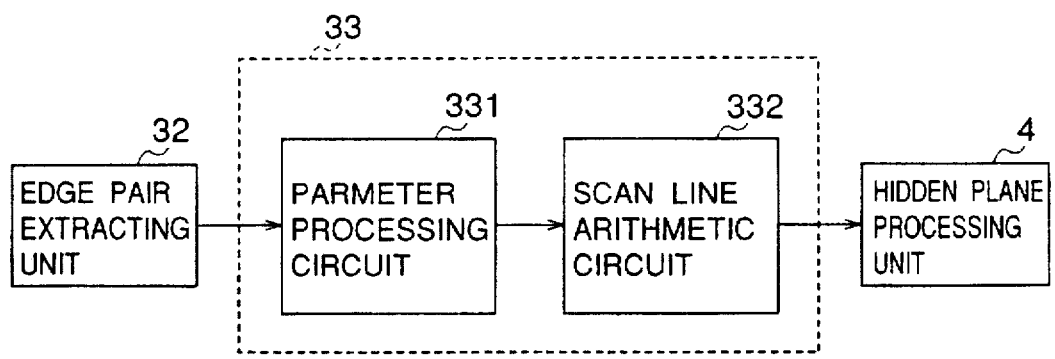
FIG. 5 is a block diagram of a scan line picturing unit shown in FIG. 2.

A description of a process performed by the scan line picturing unit 33 will now be given, with reference to FIG. 5 which shows a specific structure of the scan line picturing unit 33.

The edge pair data transferred by the edge pair extracting unit 32 is supplied to a parameter processing circuit 331 in the scan line picturing unit 33. The parameter processing circuit 331 performs a computation for a polygon edge pair respectively shown in FIGS. 12B, 12C and D. Parameters a through d in the following equation a*(b−c)+d are calculated according to a digital differential analysis; where a corresponds to DXS or DXE, b corresponds to Yn, c corresponds to Y and d corresponds to Xn.

Figure 12A:
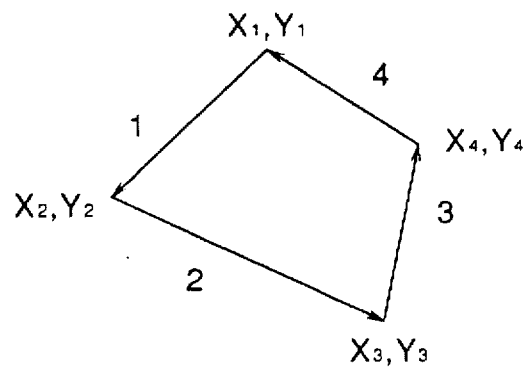
FIGS. 12A–12D are illustrations showing kinds of edge pairs.
Figure 12B:
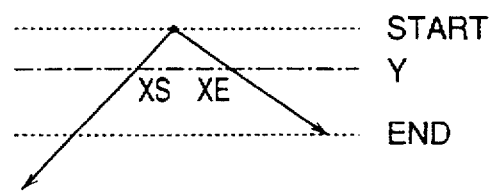

In the case of FIG. 12B:

$$DXS = \frac{X2 - X1}{Y2 - Y1} \quad DXE = \frac{X4 - X1}{Y4 - Y1}$$

$$XS = DXS*(Y2 - Y) = X1$$
$$XE = DXE*(Y4 - Y) + X1$$

Figure 12C:
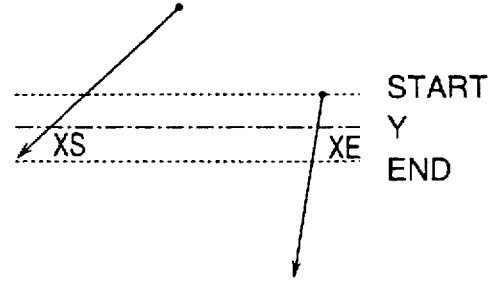

In the case of FIG. 12C:

$$DXS = \frac{X2 - X1}{Y2 - Y1} \quad DXE = \frac{X3 - X4}{Y3 - Y4}$$

-continued $$XS = DXS*(Y2 - Y) + X1$$
$$XE = DXE*(Y3 - Y) + X1$$

Figure 12D:
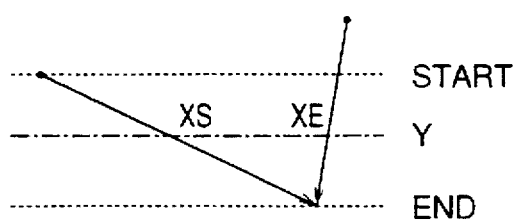
Figure 13A:
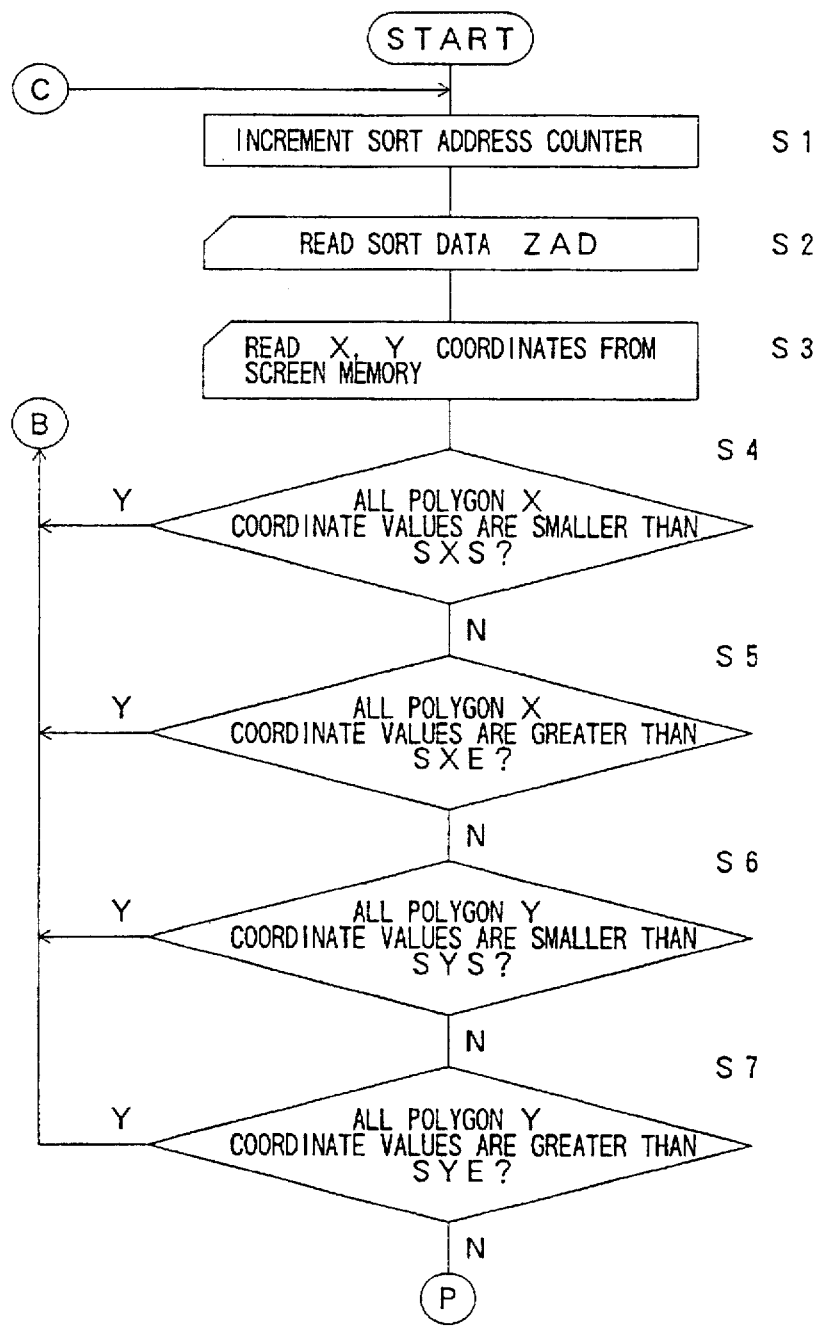
FIGS. 13A and 13B are parts of a flow chart for explaining an operation of the picture processing unit.
Figure 13B:
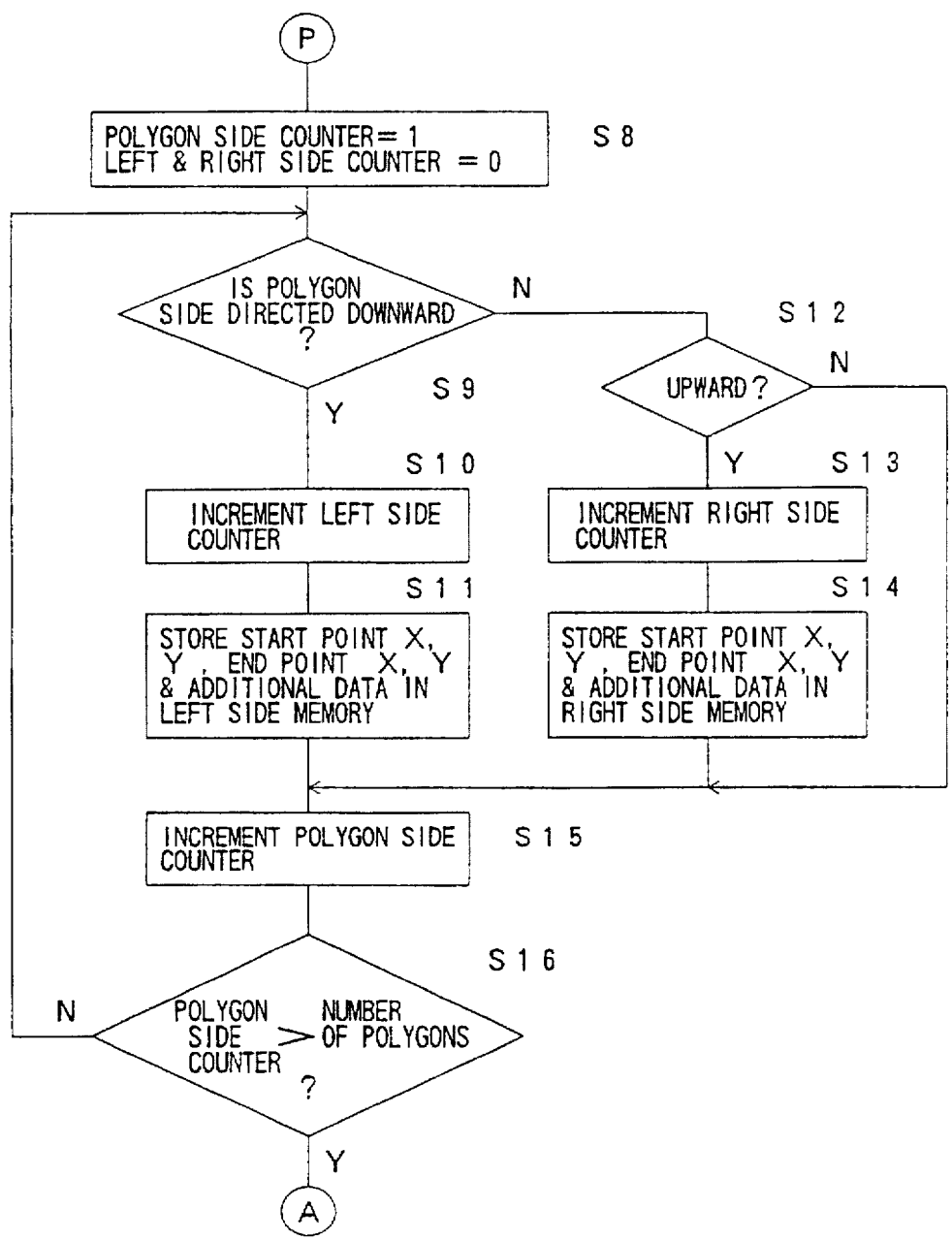
Figure 14B:
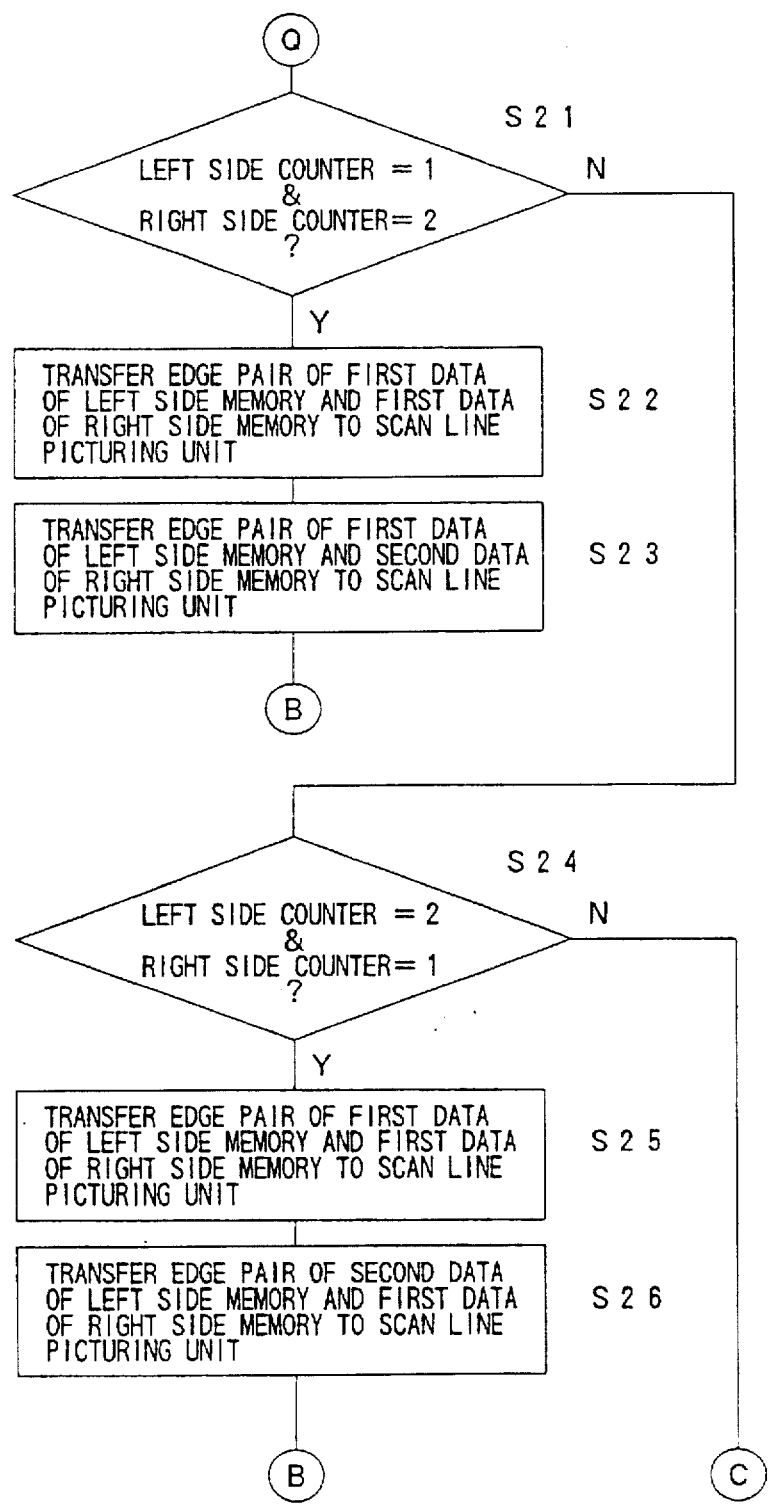
Figure 16A:
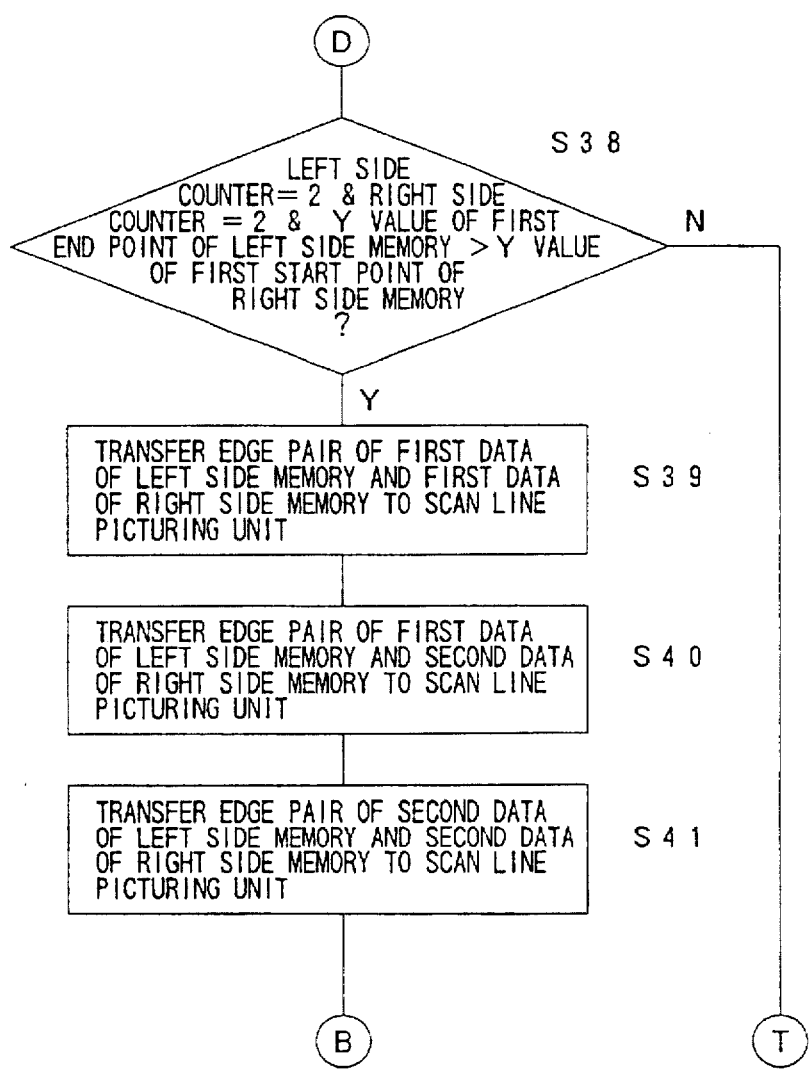
FIGS. 16A and 16B are parts of the flow chart for explaining the operation of the picture processing unit.
Figure 16B:
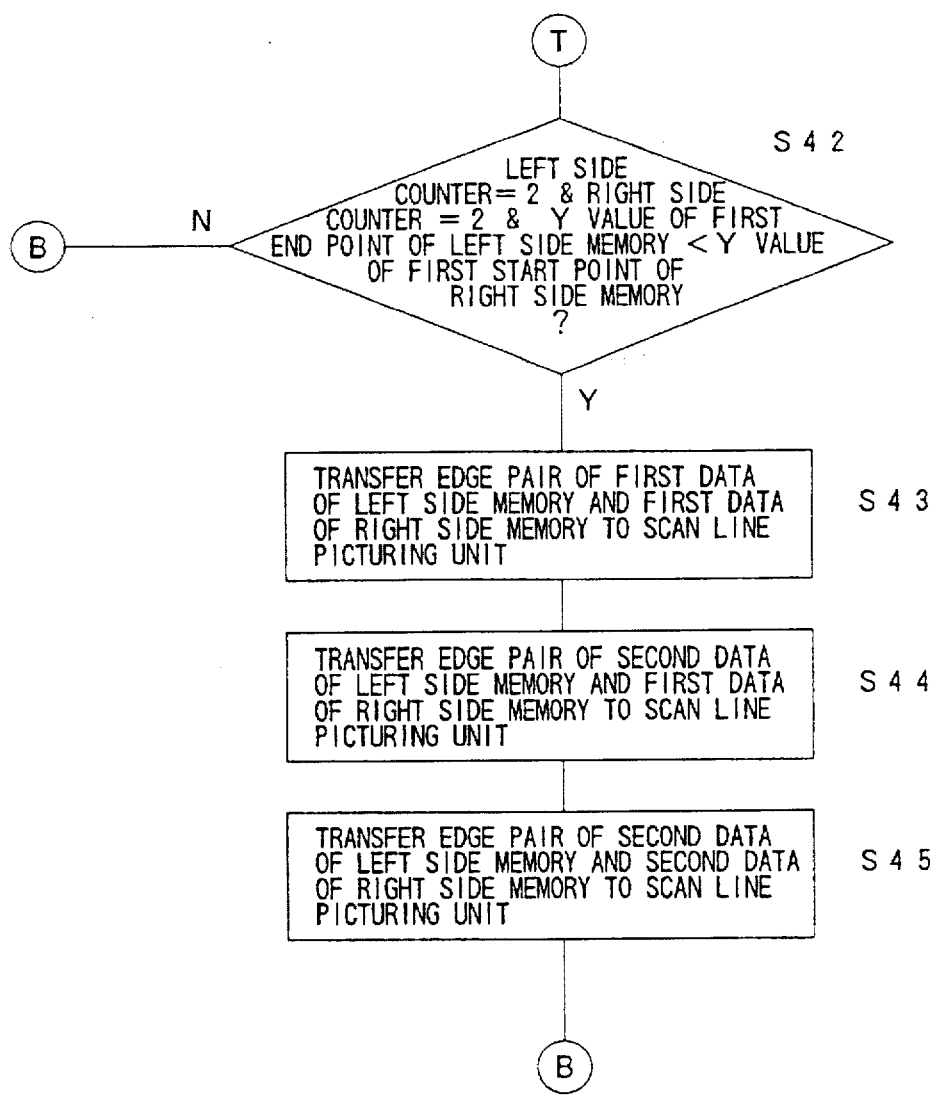
Figure 17:
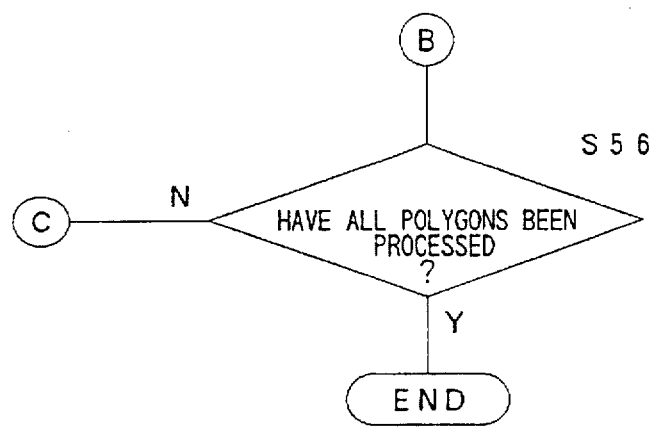
FIG. 17 is a flow chart for explaining an operation of the picture processing unit.

In the case of FIG. 12D:

$$DXS = \frac{X3 - X2}{Y3 - Y2} \quad DXE = \frac{X3 - X4}{Y3 - Y4}$$

$$XS = DXS*(Y3 - Y) + X2$$
$$XE = DXE*(Y3 - Y) + X1$$

The parameter processing circuit 331 calculates parameters a, b, and c by the above-mentioned equations, and transfer the parameters, with respect to a X start point (XS) and a X end point (XE), to a scan lien arithmetic circuit 332. The scan line arithmetic circuit 332 calculates the X start point (XS) and the X end point (XE) from a first Y coordinate to a last Y coordinate of Y, and transfers the results to the hidden plane processing unit 4.

Each data of a polygon intersection pair on a scan lien of a Y address, which has been calculated by the picture processing unit 3, is stored in registers 41 through 44 of the hidden plan processing unit 4. The XS register 41 stores a X start point (XS), and the XE register 42 stores a X end point (XE). The Y register 43 stores a scan line number, and the register 44 stores an additional data such as a polygon color.

X start point data and X end point data are respectively supplied to a dot circuit 45 from the XS register 41 and the XE register 42. The dot circuit 45 converts the data received from the registers 41 and 42 into dot data, and then supplies the dot data to a comparator 49. As shown in FIG. 31, there is a single dot or a plurality of dots. FIG. 31 shows each dot conversion when a distance from a X start point (XS) of 3 to a X end point (XE) of 22 is used. The greater the number of dots is the smaller a capacity of a flag RAM 54 becomes, but the accuracy of hidden plane processing is decreased. In the present embodiment, a two-dot conversion is adopted.

Additionally, X start point data and X end point data respectively from the registers 41 and 42 are supplied to the frame memory 51 via a memory interface 46, and only a write signal for a polygon to be displayed is supplied by a controller 55 to the frame memory 51. An address for the frame memory 51 is generated by an address generation circuit 47 which generates an address based upon Y data of a scan line supplied by the register 43. The generated address is supplied to the PCNT memory 52 at the same time as the address for the memory 51.

The dot data from the dot circuit 45 is compared, by a comparator 49, with data in the flag RAM 54. That is, the comparator 49 compares the data from the dot circuit 45 with the dot data for a previously displayed polygon so as to determine whether or not the data is for a polygon to be displayed, and the results of the comparison are supplied to the controller 55. If it is determined that the data is for a polygon to be displayed, the dot data which is a result of an OR operation performed on the dot data of the flag RAM 54, and the dot data of the dot circuit 45 is stored in the flag RAM 54.

A scan line number supplied to the register 43 is sent to a scan line polygon count memory 53. Data from the scan line polygon count memory 53 is supplied to an incrementer 48, and then the incrementer 48 increments data in the polygon count memory 53.

Figure 25:
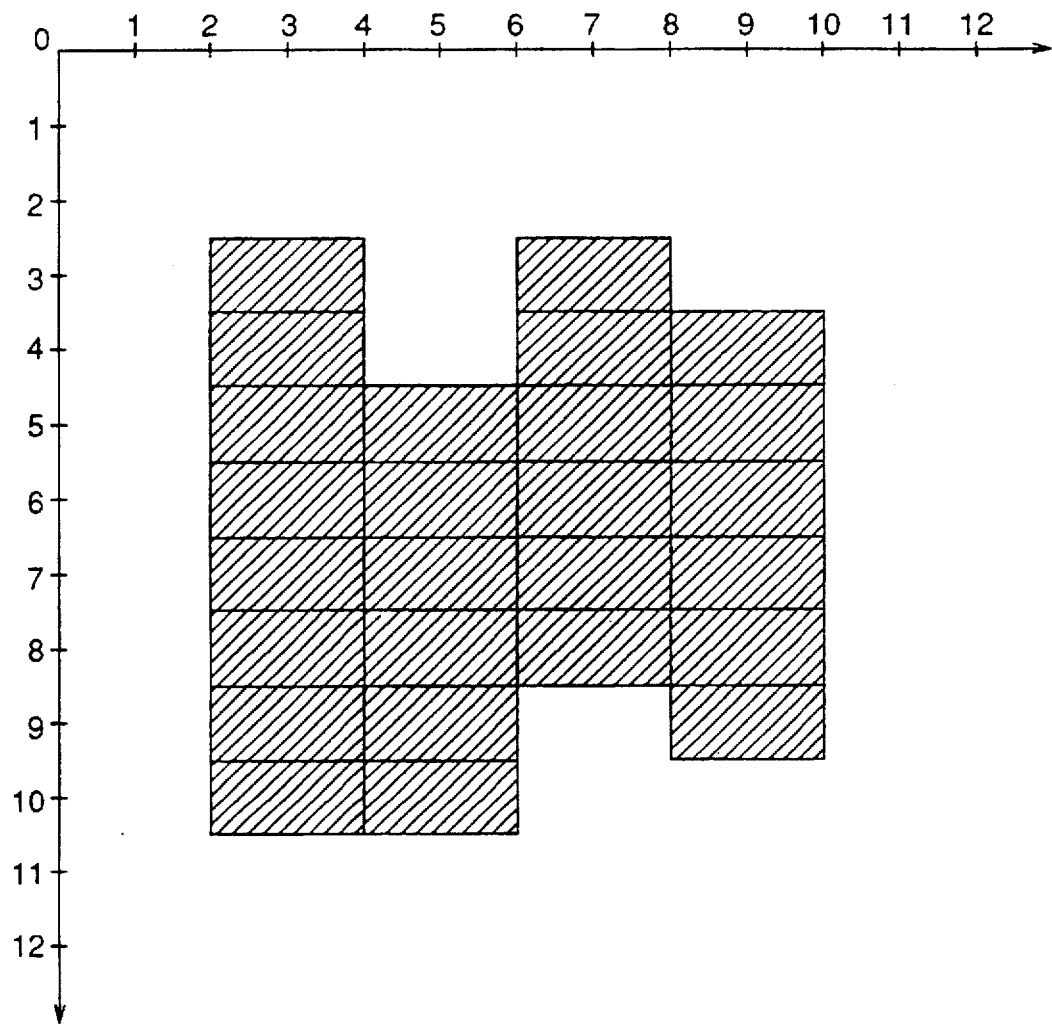
FIG. 25 is an illustration showing a flag RAM when a process is performed by the image processing apparatus according to the present invention in accordance with data for polygon 1 an polygon 2 shown in FIG. 21.

The scan line polygon count memory 53 stores the number of polygons on a scan line. The above-mentioned flag RAM 54 then stores, as shown in FIG. 25, the dot data of a polygon to be displayed.

An operation of the hidden plane processing unit is controlled by the controller 55. The controller 55 controls the operation in accordance with a flow chart shown in FIGS. 19A and 19B.

Figure 7:
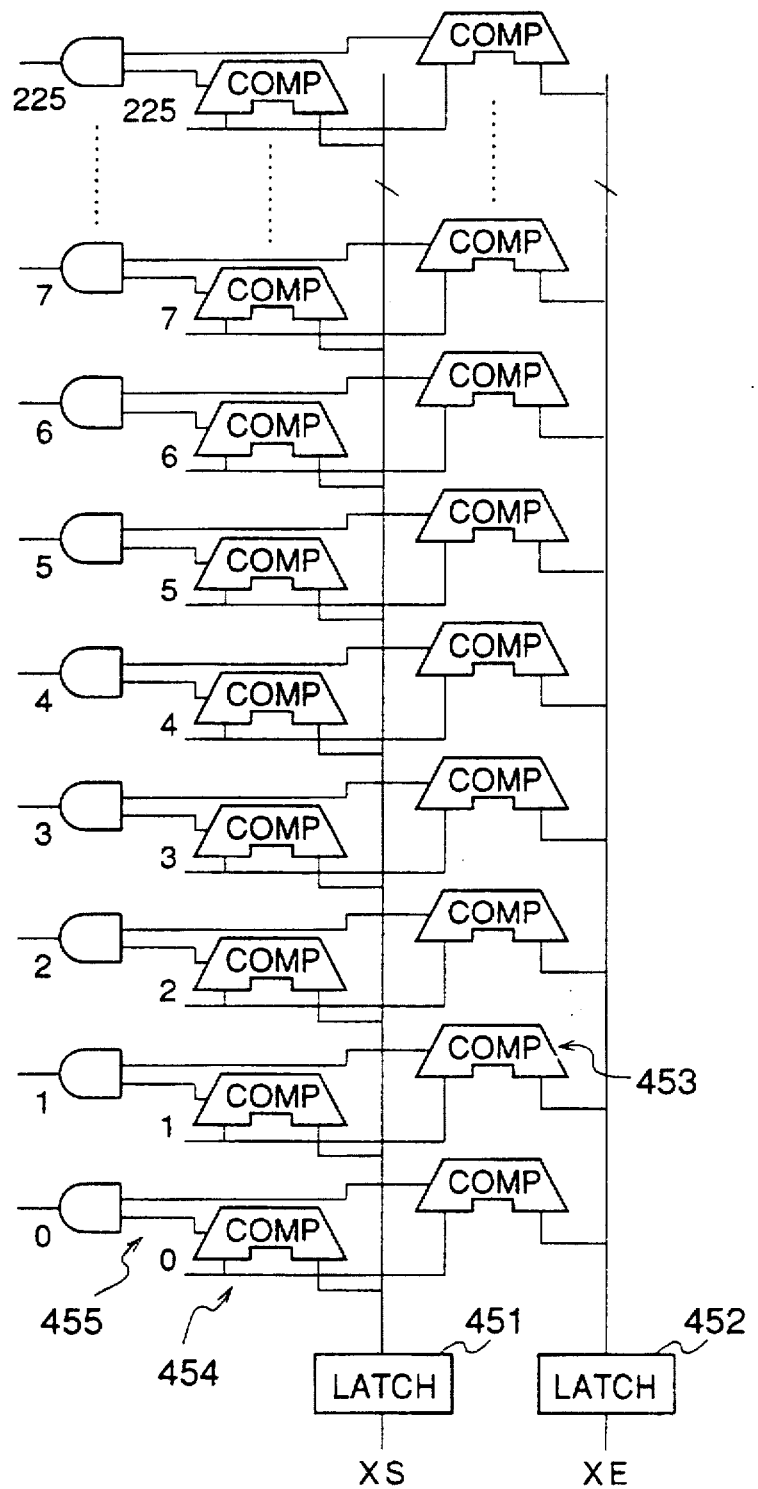
FIG. 7 is a circuit diagram of an embodiment of a dot circuit shown in FIG. 6.

FIG. 7 shows an example of the dot circuit 45. In this example, a X axis of a screen is set to 512 dots, and a two-dot conversion is adopted. Accordingly, groups of comparators 453 and 454 each include a total of 256 comparators.

Figure 20:
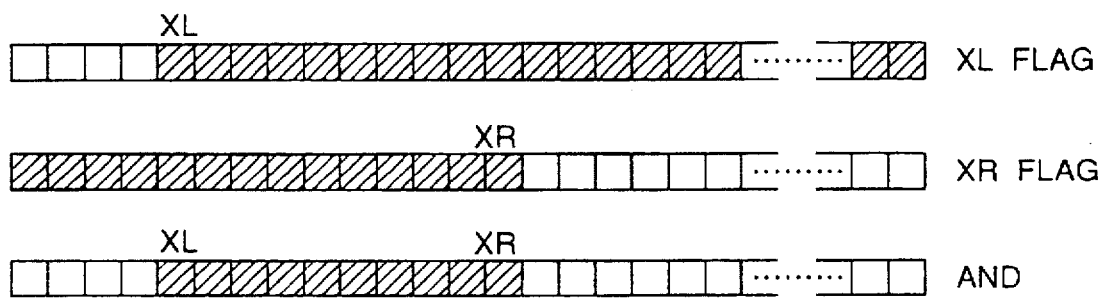
FIGS. 20A and 20B are illustrations showing a dot outputting operation.
Figure 20:
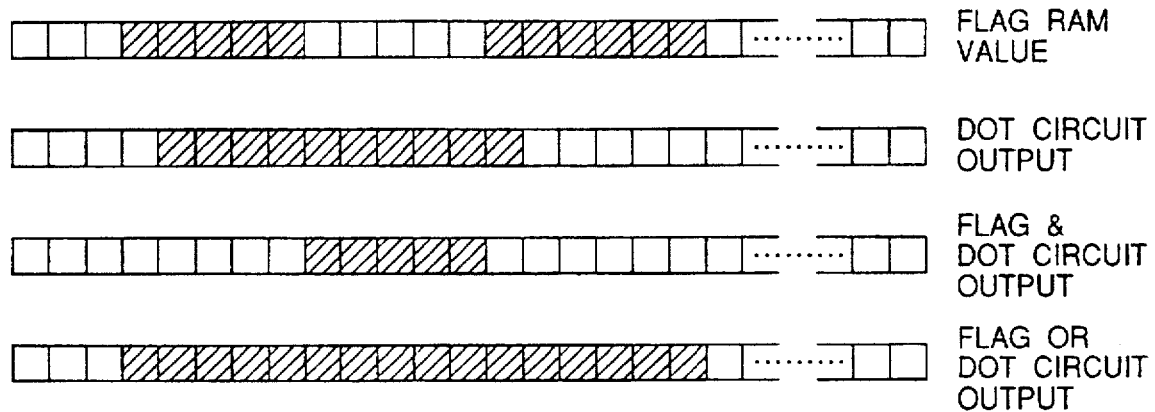

A X start point (XS) input by the XS register 41 is stored in a latch circuit 451, and a X end point (XE) input by the XE register 42 is stored in a latch circuit 452. The X end point (XE) is compared with values 0 to 255 by the group of comparators 453, and when the value is equal to or smaller than XE, a value "1" is sent to a group of AND circuit 455. The X start point (XS) is compared with values 0 to 255 by the group of comparators 454, and when the value is equal to or greater than XS, a value "1" is sent to a group of AND circuits 455. As a result, an output of the group of AND circuit becomes dot data as shown in FIG. 20A.

Figure 8:
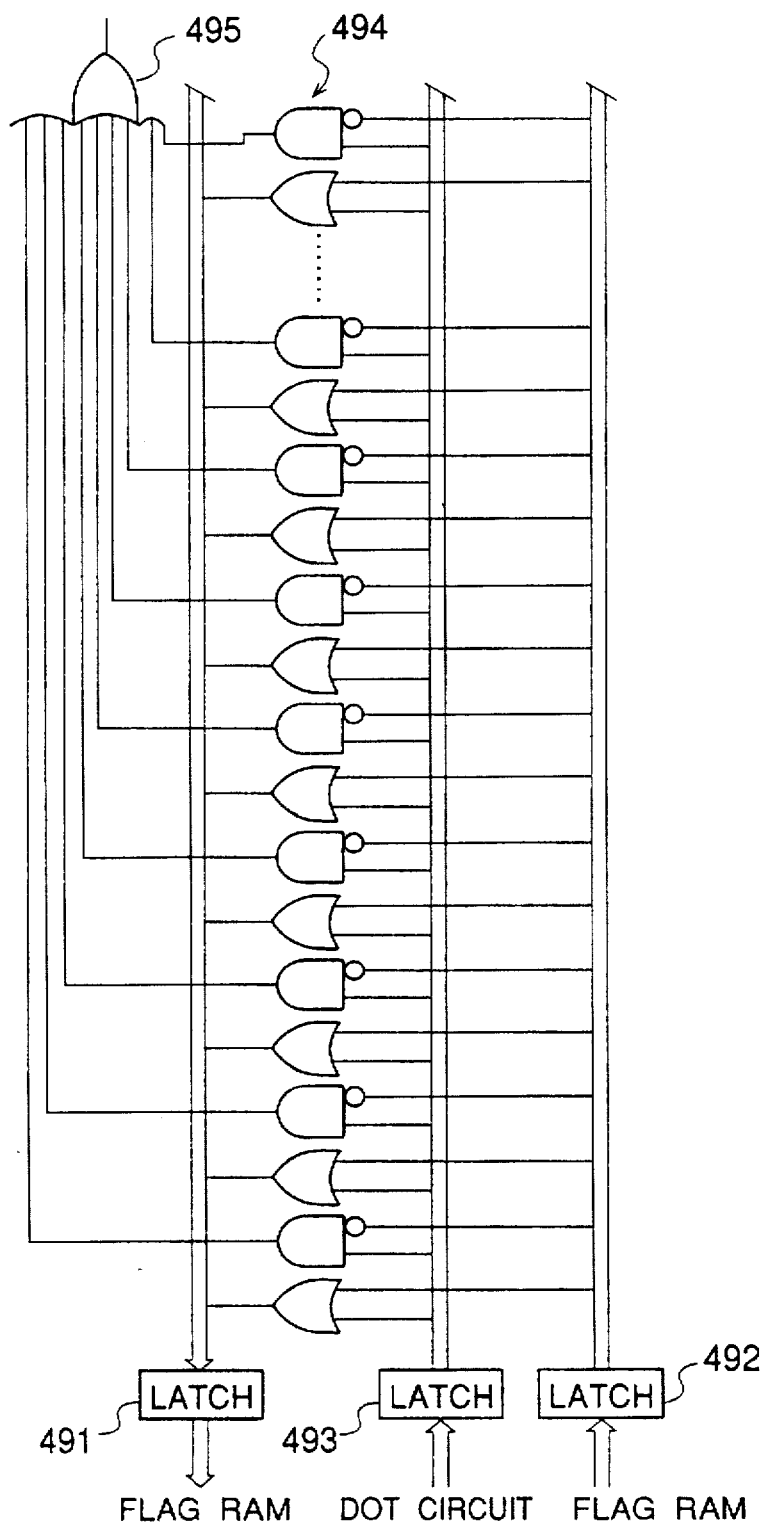
FIG. 8 is a circuit diagram of an embodiment of a comparator shown in FIG. 6.

FIG. 8 shows an example of the comparator 49. This example adopts a two-dot conversion similar to the above-mentioned example.

Data from the dot circuit 45 is stored in a latch circuit 493, and data from the flag RAM 54 is stored in a latch circuit 492.

The data stored in the latch circuits 492 and 493 is supplied to a group of AND/OR circuits 494. That is, a reversed data of the flag RAM 54, and data from the dot circuit 45 are supplied to an AND circuit. The data from the flag RAM 54 and the data from the dot circuit 45 are supplied to an OR circuit. An output from each of the AND circuits is then supplied to an OR circuit 495. When at least one of the outputs from the AND circuit in the group 494 is "1", the OR circuit 495 sends a signal to the controller 55 so that the polygon intersection pair is displayed because the polygon intersection pair is displayed by means of more than one dot. If there is no "1" among any outputs from the AND circuit in the group of AND/OR circuits 494, a signal is supplied to the controller 55 so that the polygon intersection pair is not displayed.

A description on an operation of the picture processing unit 3 will now be given, with reference to a flow chart as shown in FIG. 13A through FIG. 16B.

When data is supplied to the picture processing unit 3 from the screen memory 1 and the sort memory 2, a sort address counter in the sort address generation circuit 314 is incremented in step 1 (hereinafter a step is abbreviated as S). In S2, the sort memory supplies data representing a Z address ZAD) to the address generation circuit 312 in accordance with the address generated in the address generation circuit 314. Then, X and Y coordinates of a screen of a polygon are read in S3 from the screen memory 1 and sent to the clip circuit 315 via the memory interface 311.

In the steps from S4 to S7, a clipping process is performed by the clip circuit 315. In S4, it is judged whether or not all X coordinate values of a polygon are smaller than the screen address SXS (refer to FIG. 9). If all X coordinate values are smaller than SXS, there is no polygon in the screen, and thus the operation proceeds to S56 (see FIG. 17) in which it is determined whether all the data of the polygons have been processed, the routine returns to S1 so that the operation is repeated.

In S5, it is judged whether or not all X coordinate values of a polygon are greater than the screen address SXE. If all X coordinate values are greater than SXE, there is no polygon in the screen coordinates, and thus the operation proceeds to the above described S56. If all the X coordinate values are not greater than SXE, the routine proceeds to S6 where it is judged whether or not all Y coordinate values of the polygon are smaller than the screen address SYS. If all the Y coordinate values are smaller than SYS, there is no polygon in the screen, and thus the operation proceeds to S56. On the other than, if all the Y coordinate values are not smaller than SYS, the routine proceeds to S7 where it is judged whether or not all the Y coordinate values are greater than the screen address SYE. If all the Y coordinate values are greater than the screen address SYE, there is no polygon in the screen, and thus the routine proceeds to S56.

When all the determinations in steps from S4 to S7 are negative, there is a polygon in the screen area, and the clipping process is not performed. The routine proceeds to S8. The steps from S8 to S16 are performed in an operation for selecting sides of the polygon. In this example, a counterclockwise polygon is described.

In S8, a count value of a polygon side counter in the side selecting circuit 321 is set to 1, and count values of both the left side counter 322 and the right side counter 324 are set to 0.

In S9, it is determined whether or not the side of the polygon is directed downward. If it is directed downward, the routine proceeds to S10. In S10, a count value of the left side counter 322 is incremented by 1, and the routine proceeds to S11. In S11, start points X, Y end points X, Y, and additional data are stored in the left side memory 323, and then the routine proceeds to S15. In S15, the count value of the polygon side counter is incremented, and in S16 it is judged whether or not the count value of the polygon side counter is greater than the number of polygon sides. If the count value of the polygon side counter is smaller than the number of polygon sides, the routine returns to S9 so as to repeat the steps from S9 to S16. When the count value of the polygon side counter has become greater than the number of polygon sides, the routine proceeds to S17.

On the other hand, if the side of the polygon is not directed downward, the routine proceeds to S12 where it is determined whether or not the polygon side corresponding to the polygon side counter is directed upward. If it is directed upward, the routine proceeds to S13, and if it is not, the routine proceeds to S15. In S13, the count value of the right side counter 324 is incremented, and then the routine proceeds to S14. In S14, start points X, Y, end points X, Y and additional data are stored in the right side memory 325, and the routine proceeds to S15. As mentioned above, the steps from S9 to S16 are repeated until the count number of the polygon side counter has become greater than the number of polygon sides.

The steps from S17 to S45 are provided for an operation of the edge pair transfer circuit 326. In S17, the data in the left side memory 323 is arranged in ascending order of the start point of the polygon side. In S18, the data in the right side memory 325 is arranged in ascending order of the start point of the polygon side, and the routine proceeds to S19.

In S19, it is determined whether or not the count values of both the left side counter and the right side counter are 1. When both are 1, the routine proceeds to S20. In S20, an edge pair of the first data of the left side memory 323 and the first data of the right side memory 325 are transferred to the scan line picturing circuit 33, and the routine proceeds to S56. In these steps, S19 and S20, the operation shown in FIG. 11A is performed.

When both of the above count values are not equal to 1, the routine proceeds to S21 where it is determined whether or not the count value of the left side counter is 1 and the count value of the right side counter is 2. If the count value of the left side counter is 1 and that of the right side counter is 2, the routine proceeds to S22, and if not, the routine proceeds to S24. In S22, an edge pair of the first data of the left side memory and the first data of the right side memory are transferred to the scan line picturing circuit 33. In S23, an edge pair of the first data of the left side memory and the second data of the right side memory are transferred to the scan line picturing circuit 33. The routine then proceeds to S56. In these steps, from S21 to S23, the operation shown in FIG. 11B is performed.

In S24, it is determined whether or not the count value of the left side counter is 2 and that of the right side counter is 1. If the count value of the left side counter is 2 and that of the right side counter is 1, the routine proceeds to S25, and if not, the routine proceeds to S27. In S25, an edge pair of the first data of the left side memory and the first data of the right side memory are transferred to the scan line picturing circuit 33, and the routine proceeds to S26. In S26, an edge pair of the second data of the left side memory and the first data of the right side memory are transferred to the scan line picturing circuit 33. The routine then proceeds to S56. In these steps, from S24 to S26, the operation shown in FIG. 11C is performed.

In S27, it is determined whether or not the count value of the left side counter is 1 and that of the right side counter is 3. If the count value of the left side counter is 1 and that of the right side counter is 3, the routine proceeds to S28 and if not, the routine proceeds to S31. In S28, and edge pair of the first data of the left side memory and the first data of the right side memory are transferred to the scan line picturing circuit 33, and the routine proceeds to S29. In S29, an edge pair of the first data of the left side memory and the second data of the right side memory are transferred to the scan line picturing circuit 33, and the routine proceeds to S30. In S30, an edge pair of the first data of the left side memory and the third data of the right side memory are transferred to the scan line picturing circuit 33, and the routine proceeds to S56. In these steps, from S27 to S30, the operation shown in FIG. 11D is performed.

In S31, it is determined whether or not the count value of the left side counter is 3 and that of the right side counter is 1. If the count value of the left side counter is 3 and that of the right side counter is 1, the routine proceeds to S32, and if not, the routine proceeds to S35. In S32, an edge pair of the first data of the left side memory and the first data of the right side memory are transferred to the scan line picturing circuit 33, and the routine proceeds to S33. In S33, an edge pair of the second data of the left side memory and the first data of the right side memory are transferred to the scan line picturing circuit 33, and the routine proceeds to S34. In S34, an edge pair of the third data of the left side memory and the first data of the right side memory are transferred to the scan line picturing circuit 33, and the routine proceeds to S56. In these steps, from S31 to S34, the operation shown in FIG. 11E is performed.

In S35, it is determined whether or not the count value of the left side counter is 2, that of the right side counter is 2 and the Y value of the first end point of the left side memory is equal to the Y value of the first start point of the right side memory. If the count value of the left side counter is 2, that of the right side counter is 2, and the above Y values are equal to each other, an edge pair of the first data of the left side memory and the first data of the right side memory are transferred, in S36, to the scan line picturing circuit 33, and the routine proceeds to S37. In S37, an edge pair of the second data of the left side memory and the first data of the right side memory are transferred to the scan line picturing circuit 33. The routine then proceeds to S56. In these steps, from S35 to S37, the operation shown in FIG. 11F is performed.

If the above Y values are not equal to each other, the routine proceeds to S38 where it is determined whether or not the count value of the left side counter is 2, that of the right side counter is 2 and the Y value of the first end point of the left side memory is greater than the Y value of the first start point of the right side memory. If the count value of the left side counter is 2, that of the right side counter is 2, and the Y value of the first end point of the left side memory is greater than the Y value of the first start point of the right side memory, the routine proceeds to S39 otherwise, the routine proceeds to S42. In S39, an edge pair of the first data of the left side memory and the first data of the right side memory are transferred to the scan lien picturing circuit 33, and the routine proceeds to S40. In S40, an edge pair of the first data of the left side memory and the second data of the right side memory are transferred to the scan line picturing circuit 33. In S41, an edge pair of the second data of the left side memory and the second data of the right side memory are transferred to the scan line picturing circuit 33. The routine then proceeds to S56. In these steps, from S36 to S41, the operation shown in FIG. 11G is performed.

In S42, it is determined whether or not the count value of the left side counter is 2 and that of the right side counter is 2. S42 also determines whether or not the Y value of the first end point of the left side memory is smaller than the Y value of the first start point of the right side memory. If the count value of the left side counter is 2 and that of the right side counter is 2, and if the Y value of the first end point of the left side memory is smaller than the Y value of the first start point of the right side memory, the routine proceeds to S56. Otherwise, the routine proceeds to S43. In S43, an edge pair of the first data of the left side memory and the first data of the right side memory are transferred to the scan line picturing circuit 33, and the routine proceeds to S44. In S44, an edge pair of the second data of the left side memory and the first data of the right side memory are transferred to the scan line picturing circuit 33. In S45, an edge pair of the second data of the left side memory and the second data of the right side memory are transferred to the scan line picturing circuit 33. The routine then proceeds to S56. In these steps, from S42 to S45, the operation shown in FIG. 11H is performed.

Figure 18:
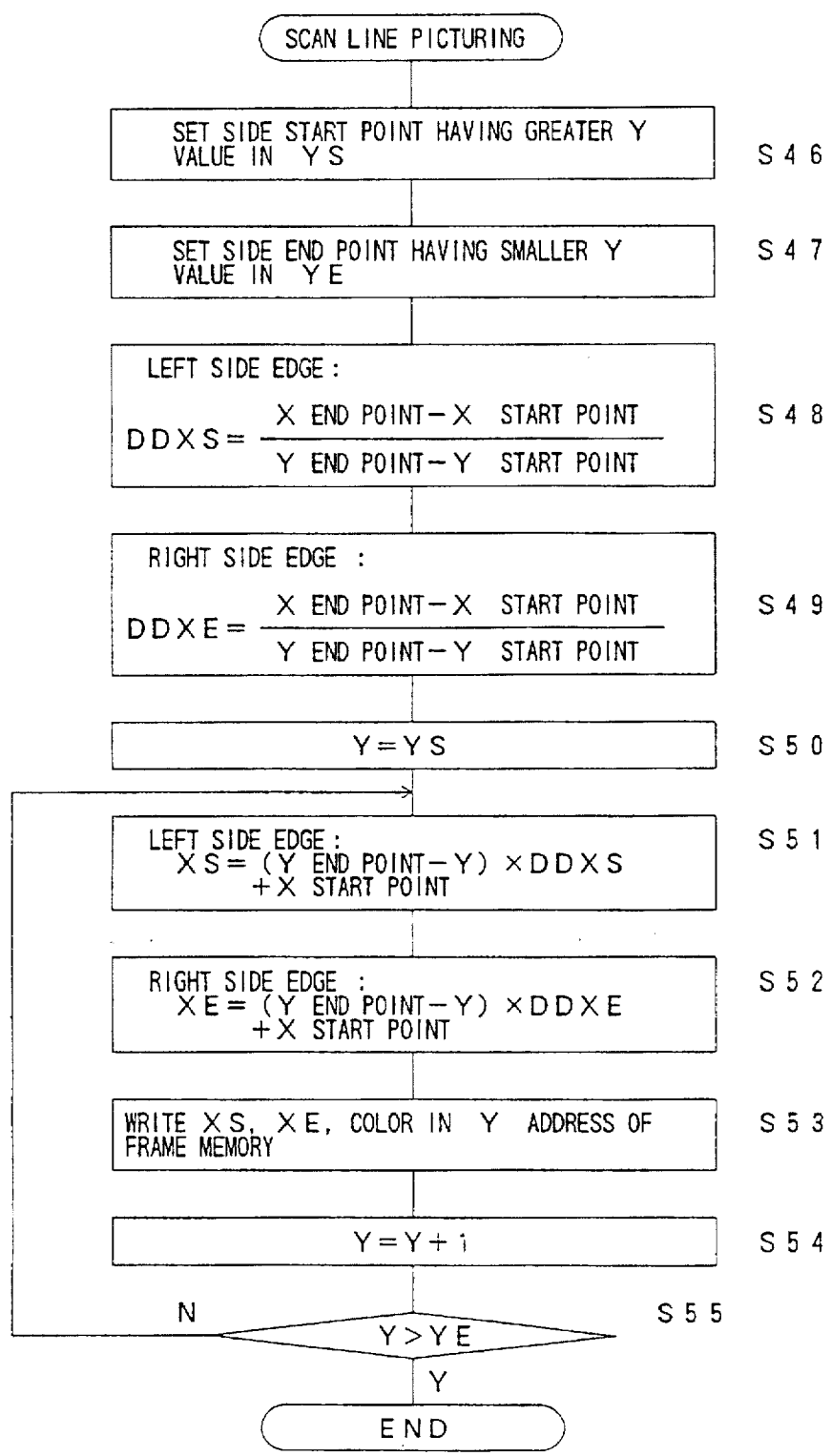
FIG. 18 is a flow chart for explaining an operation of the scan line picturing unit.

A description will now be given, with reference to a flow chart shown in FIG. 18 for an operation of the scan line picturing unit 33.

Figure 29:
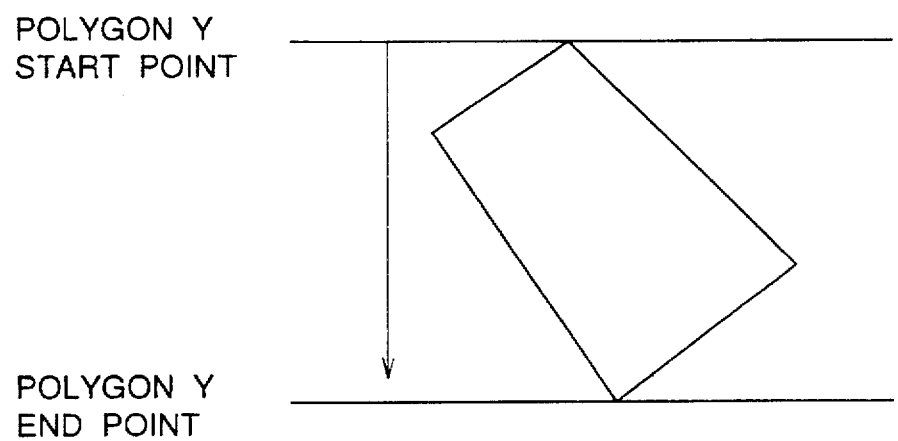
FIG. 29 is an illustration showing a relationship between a Y start point and a Y end point of a polygon.

In S46, the greatest Y value of side start points of edge pairs is set in the YS register, and in S47, the smallest Y value of side end points of edge pairs is set in the YE register. As a result, a Y start point YS and a Y end point YE shown in FIG. 29 are obtained, and the routine proceeds to S48.

In S48, DDXS of the left side edge are obtained, and in S49, DDXE of the right side edge is obtained. The routine then proceeds to S50.

In S50, Y is set to YS. In S51, XE of the left side edge is obtained, and in S52, XS of the right side edge is obtained. The routine then proceeds to S53.

In S53, XS, XE and color data of a polygon are written at a Y address in the frame memory 51. In S54, the Y address is incremented by 1, and in S55 it is judged whether or not Y is greater than YE. If Y is smaller than YE, the routine returns to S51 to repeat the operation from S51 to S55. When Y has become greater than YE, the scan lien picturing operation is completed. This operation is repeated until all the polygons have been processed.

Figure 19:
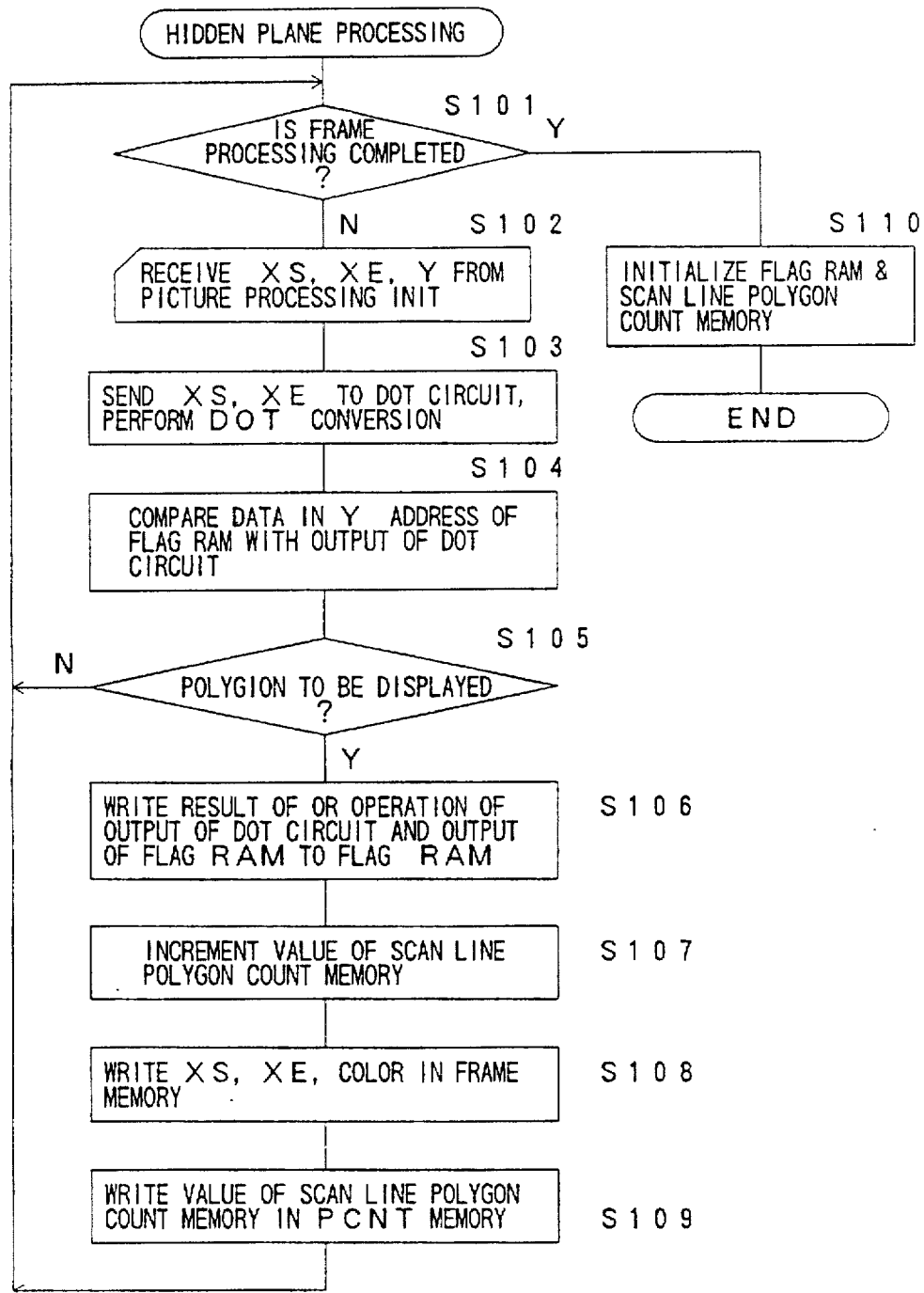
FIG. 19 is a flow chart for explaining an operation of the hidden plane processing unit.

A description will now be given, with reference to a flow chart shown in FIG. 19 for an operation of the hidden plane processing unit.

When the operation of the hidden plane processing unit is started, it is judged in S101 whether or not a frame processing has been completed. If it has not been completed yet, the routine proceeds to S102. Otherwise, the routine proceeds to S110. Immediately after the start of the operation, the frame processing has not been completed, and thus the routine proceeds to S102 where data XS, XE and a can line Y from the picture processing unit 3 are respectively received by the registers 41, 42 and 43, and the routine then proceeds to S103.

In S103, XS and XE are supplied to the dot circuit 45 so that the XS and XE are converted into dot data, and the routine proceeds to S104. In S104, data for address Y of the flag RAM 54 is compared with the output of the dot circuit 45, and the routine proceeds to S105.

Figure 6:
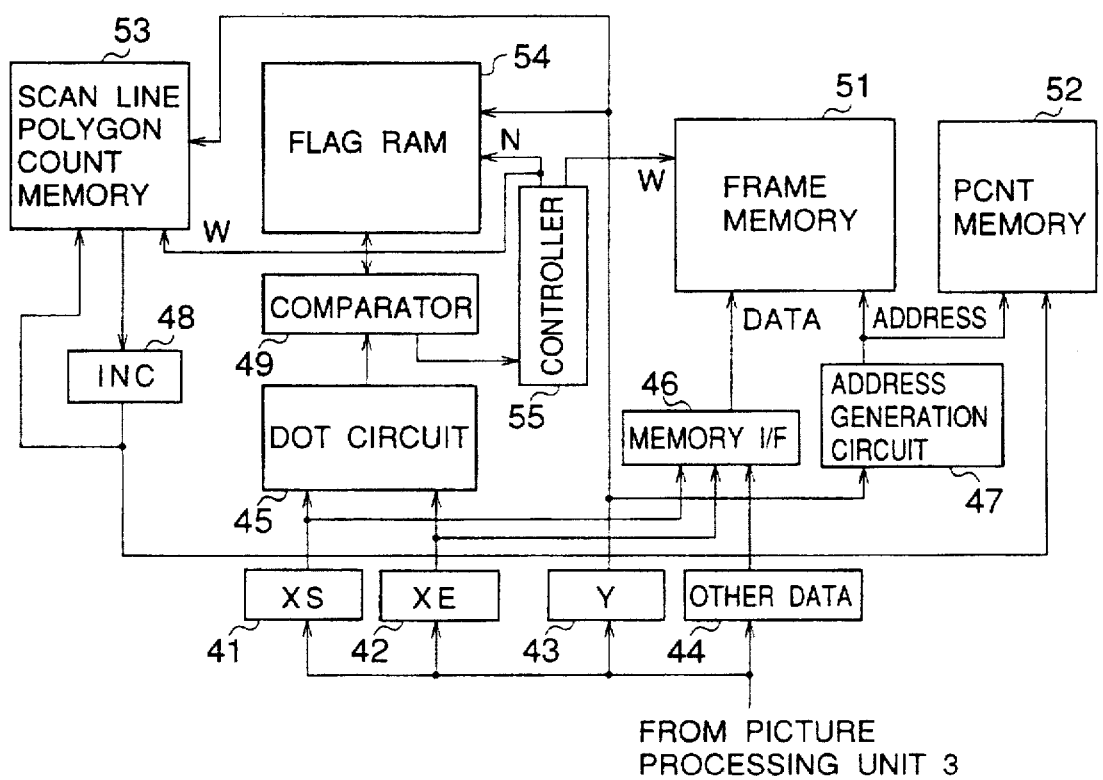
FIG. 6 is a block diagram of a hidden plane processing unit shown in FIG. 1.

In S105, it is judged whether or not the polygon is to be displayed. More specifically, in S105, it is judged whether or not the part of the scan line Y between XS and XE is to be displayed, in accordance with the foregoing description of the hidden plane processing unit 4 (FIGS. 5 and 6). If the polygon is not to be displayed, the routine returns to S101 to repeat the operation from S101 to S105. If the polygon is to be displayed, the routine proceeds to S106.

In S106, an OR of the output of the dot circuit 45 and the output of the flag RAM 54 is written in the flag RAM 54, and the routine proceeds to S107. In S107, a value of the scan line polygon count memory 53 is incremented, and in S108, XS, XE and other data such as color data are written in the frame memory. Then, the routine proceeds to S109.

In S109, the value of the scan line polygon count memory 53 is written in the PCNT memory, and the routine returns to S101.

When the frame processing has been completed, the routine proceeds from S101 to S110 where flag RAM 54 and the scan line polygon count memory 53 are initialized, and then the operation ends.

A description will now be given, with reference to FIGS. 21 to 27B, for a drawing process for a polygon.

Figure 21:
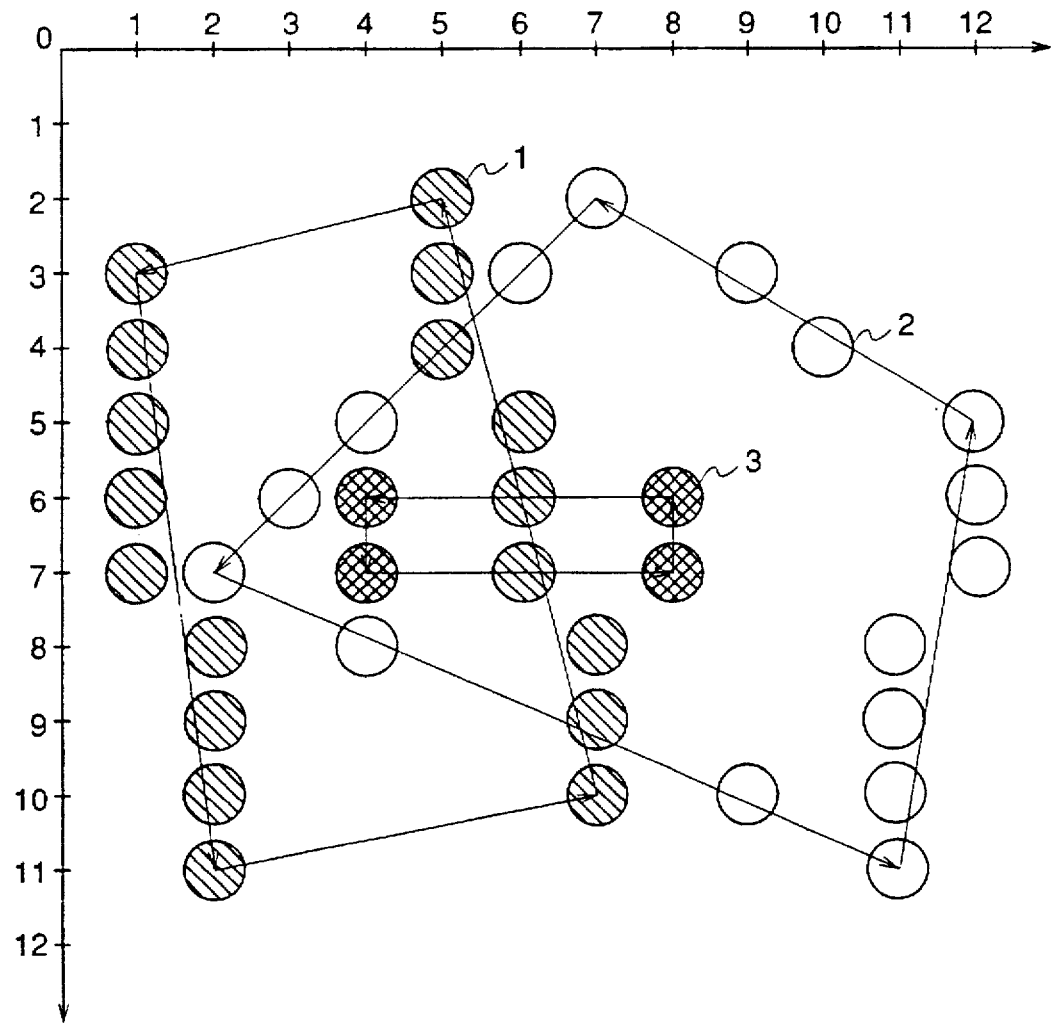
FIG. 21 is an illustration showing polygons drawn without processing performed by the hidden plane processing unit.

As shown in FIG. 26A, polygon data for three polygons is stored in the screen memory 1. If these three polygons are drawn without performing any processing, the picture becomes as shown in FIG. 21.

Figure 22:
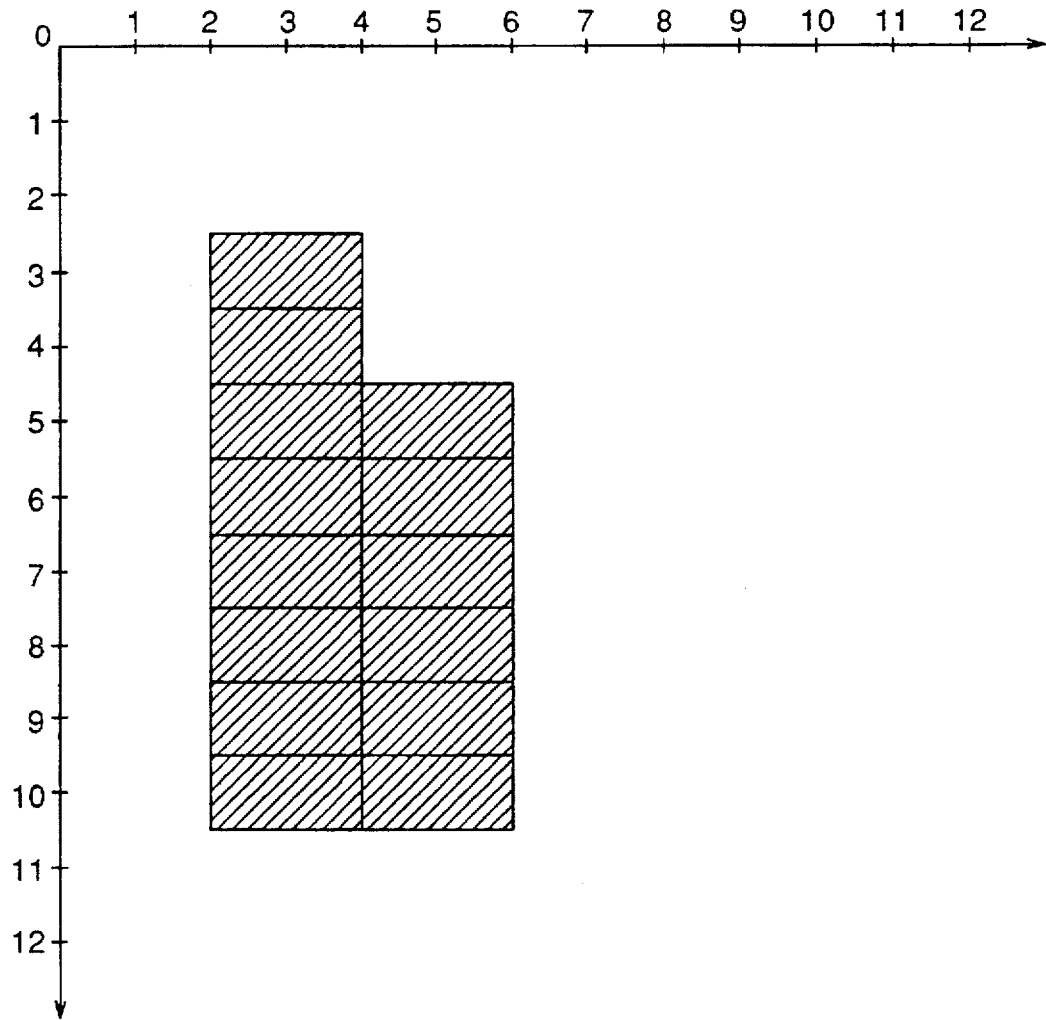
FIG. 22 is an illustration showing a flag RAM when a process is performed by the image processing apparatus according to the present invention in accordance with data only for polygon 1 shown in FIG. 21.

FIG. 22 shows a content of the flag RAM 54 when only the data of the polygon 1 as shown in FIG. 26A is processed in accordance with the present invention.

Figure 23:
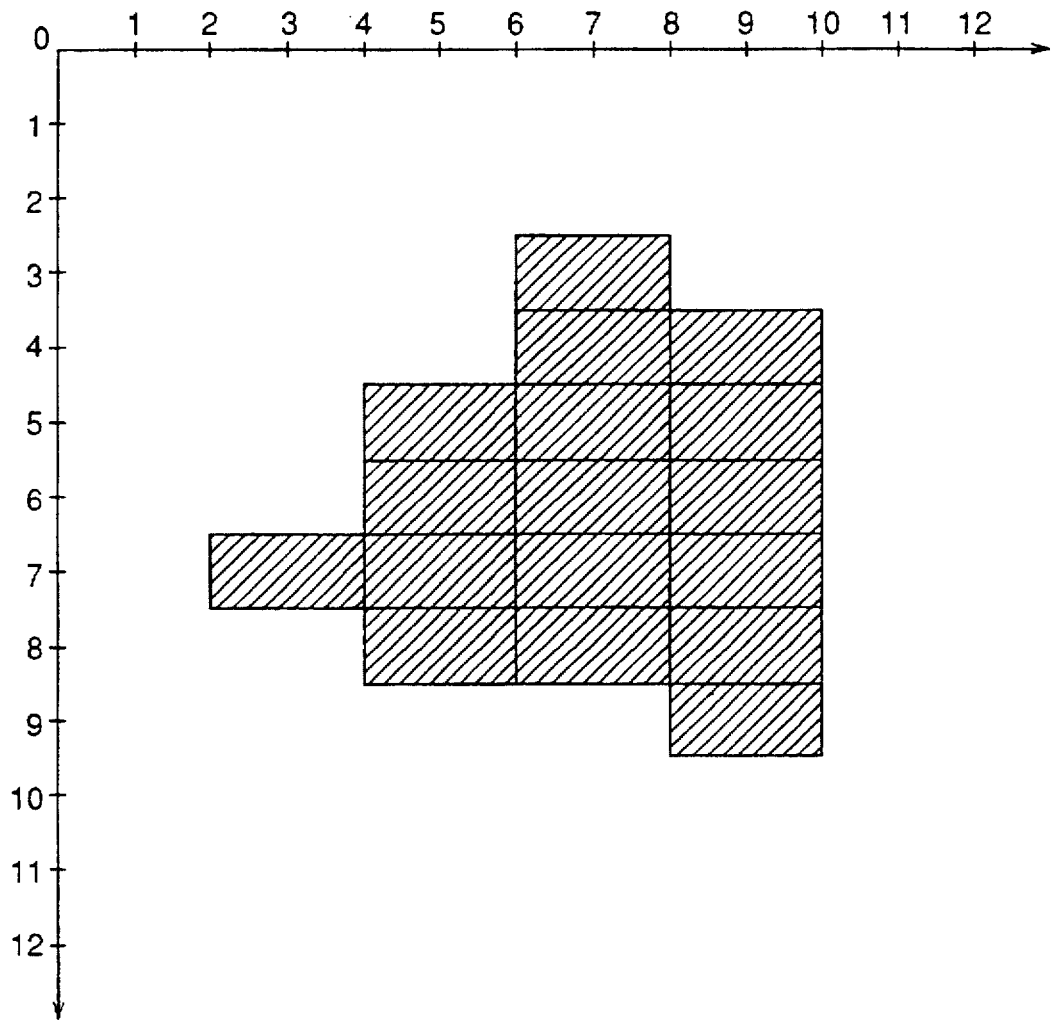
FIG. 23 is an illustration showing a flag RAM when a process is performed by the image processing apparatus according to the present invention in accordance with data only for polygon 2 shown in FIG. 21.

FIG. 23 shows a content of the flag RAM 54 when only the data of the polygon 2 as shown in FIG. 26A is processed in accordance with the present invention.

Figure 24:
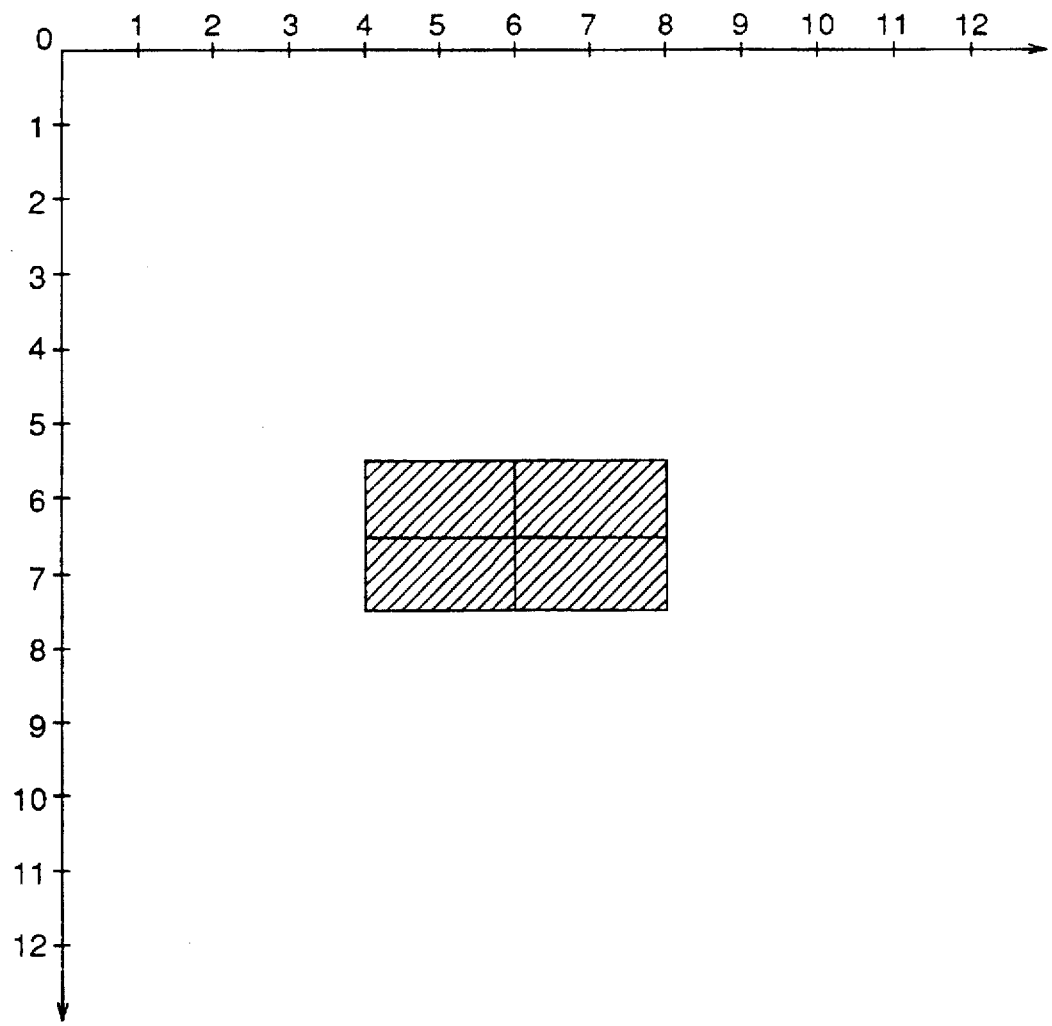
FIG. 24 is an illustration showing a flag RAM when a process is performed by the image processing apparatus according to the present invention in accordance with data only for polygon 3 shown in FIG. 21.

FIG. 24 shows a content of the flag RAM 54 when only the data of the polygon 3 as shown in FIG. 26A is processed in accordance with the present invention.

The data of each of the polygons 1, 2, 3 is processed in accordance with the data written in the sort memory 2. First the data of the polygon 1 is processed. The polygon data is read out from the screen memory 1 in accordance with the data written in the sort memory 2. The processed data of the polygon 1 is then stored in the frame memory 51. After the processing of the data of the polygon 1 has been completed, the content of the Flag RAM 54 is illustrated in FIG. 22.

The data of the polygon 2 is then processed. The polygon data is read out from the screen memory 1 in accordance with the data written in the sort memory 2. During this process, if the output of the dot circuit 45 is compared with the content of the flag RAM 54 by the comparator 49, the polygon 2 is judged to be a polygon to be displayed. The data for polygon 2 is then stored in the frame memory 51. After the processing of the data of the polygon 2 has been completed, the content of the flag RAM 54 is illustrated in FIG. 25 because the result of an OR operation performed on the data for the polygon 2 and the previously processed data for the polygon 1 is written in the flag RAM 54.

Further, the data of the polygon 3 is processed. The polygon data is read out from the screen memory 1 in accordance with the data written in the sort memory 2. During this process, the output of the dot circuit 45 is compared with the content of the flag RAM 54 by the comparator 49. Since the data for the polygon 3 as shown in FIG. 24 is completely overlapped with the content of the flag RAM 54 as shown in FIG. 25, the data for the polygon 3 is not written in the frame memory 51.

FIG. 27A shows an example of the content of the frame memory 51 when a hidden plane processing is not performed, and FIG. 27B shows an example of the content of the frame memory 51 when the hidden plane processing according to the present invention is performed. As is apparent from the above description and FIG. 27B, only the data for a polygon to be displayed is stored in the frame memory 51.

The present invention is not limited to the specifically disclosed embodiments, and variations and modifications may be made without departing from the scope of the present invention.

What is claim is:

1. An image processing apparatus which processes image data of a picture including polygons to be displayed on a screen comprising scan lines of a display unit, the image processing apparatus comprising:

first memory means for storing at least X and Y coordinate data for edge end points of the polygons;

second memory means for storing polygon numbers, said polygon numbers being arranged in a processing order for the polygons;

first computing means, connected to said first memory means and said second memory means, for computing, from the data for edge end points stored in said first memory means, data for sides of each of the polygons corresponding to each of said polygon numbers stored in said second memory means;

second computing means for computing data for a pair of edges in accordance with the data for sides of each of the polygons supplied by said first computing means, each of said pair of edges intersecting with the scan line;

third computing means for computing coordinate data for a pair of intersection points in accordance with said data for said pair of edges supplied by said second computing means; and processing means for comparing said coordinate data of each of the polygons supplied by said third computing means so as to compile dot data which indicates a display portion of the scan line corresponding to the polygons to be displayed, and for outputting said dot data of the polygons by synchronizing with a scan operation of the display unit.

2. The image processing apparatus as claimed in claim 1, wherein said second computing means includes:

vector computing means for computing a line vector of each side of each of the polygons in accordance with the data for edge end points supplied by said first memory means and the data for the sides of each of the polygons, and for determining a direction of said line vector;

sorting means for sorting each side of the polygons as either a left side or a right side in accordance with said direction of said line vector; and edge pair computing means for computing said data for said pair of edges in accordance with the number of said sides sorted as left sides and the number of said sides sorted as right sides.

3. The image processing apparatus as claimed in claim 2, wherein said edge pair computing means comprises:

a left side counter, a count value of which is incremented for each side sorted as a left side;

a left side memory which stores data for each side sorted as a left side;

a right side counter, a count value of which is incremented for each side sorted as a right side; and a right side memory which stores data for each side sorted as a right side.

4. The image processing apparatus as claimed in claim 1, wherein said third computing means includes:

means for computing, by a digital differential analysis, X coordinate values of each of said pair of intersecting points for each scan line.

5. The image processing apparatus as claimed in claim 2, wherein said third computing means includes:

means for computing, by a digital differential analysis, X coordinate values of each of said pair of intersecting points for each scan line.

6. An image processing apparatus which processes image data of a picture including polygons to be displayed on a screen comprising scan lines on a display unit, the image processing apparatus comprising:

first memory means for storing at least X and Y coordinate data for edge end points of the polygons;

second memory means for storing polygon numbers, said polygon numbers being arranged in a processing order for the polygons;

first computing means, connected to said first memory means and said second memory means, for computing, from the data for edge end points stored in said first memory means, data for sides of each of the polygons corresponding to each of said polygon numbers stored in said second memory means;

second computing means for computing data for a pair of edges in accordance with the data for sides of polygons supplied by said first computing means, each of said pair of edges intersecting with the scan line;

third computing means for computing coordinate data for a pair of intersecting points where said data for said pair of edges supplied by said second computing means intersect with the scan line; and hidden plane processing means for generating dot data for the polygons, said dot data designating a part of the scan line to be displayed on the screen for representing the polygons and being defined by two X coordinate values of said pair of said intersecting points of the polygons;

third memory means which stores only dot data to be displayed; and outputting means for outputting said dot data of the polygons supplied by said third memory means by synchronizing said dot data with a scan operation of the display unit.

7. The image processing apparatus as claimed in claim 6, wherein said hidden plane processing means includes:

generating means for generating said dot data for polygons for each scan line of the screen in accordance with said X coordinate values supplied by said third computing means;

a flag memory which stores said dot data for the polygons;

determining means for determining whether or not dot data is to be displayed by comparing dot data for said polygon generated by said generating means with dot data for another polygon stored in said flag memory; and rewriting means for rewriting said dot data stored in said flag memory based on a result of an OR operation of the dot data to be displayed which is output from said determining means and the data of previously processed dot data stored in said flag memory.

8. The image processing apparatus as claimed in claim 7, wherein said generating means includes:

means for generating dot data which designates a dot including a predetermined number of single dots, each of said single dots included in each scan line.

9. The image processing apparatus as claimed in claim 6, wherein said second computing means includes:

vector computing means for computing a line vector of each side of each of the polygons in accordance with the data for edge end points supplied by said first memory means and the data for sides of each of the polygons, and for determining a direction of said line vector;

sorting means for sorting each side of the polygons as either a left side or a right side in accordance with said direction of said line vector; and edge pair computing means for computing said data for said pair of edges in accordance with the number of said sides sorted as left sides and the number of said sides sorted as right sides.

10. The image processing apparatus as claimed in claim 9, wherein said edge pair computing means includes:

a left side counter, a count value of which is incremented for each side sorted a left side;

a left side memory which stores data for each side sorted as a left side;

a right side counter, a count value of which is incremented for each side sorted as a right side; and a right side memory which stores data for each side sorted as a right side.

11. The image processing apparatus as claimed in claim 6, wherein said third computing means includes:

means for computing, by a digital differential analysis, X coordinate values of each of said pair of intersecting points for each scan line.

12. A method of converting polygon data into raster data for displaying on a screen, the polygon data representing a plurality of overlapping polygons and being sorted in a depth direction, the screen displaying a content of a frame buffer, comprising the steps of:

a) determining intersecting points between a single scan line and selected pairs of sides of each of the plurality of the polygons, a portion of the scan line between the intersecting points defining a polygon portion;

b) comparing the polygon portion and a corresponding content of the frame buffer;

c) determining whether a portion of the scan line corresponding to each pair of the intersecting points is displayed on the screen based upon said step b), the portion of the scan line to be displayed defining dot data;

d) compiling the dot data for each of the polygons; and e) outputting the dot data compiled in said step d) in synchronization with the scan line.

13. The method of converting polygon data according to claim 12 wherein said step a) further comprises additional steps of:

d) dividing the sides based upon predetermined directions with respect to the scan line;

e) counting a number of sides for each of the predetermined directions, the number indicating the selected pairs of sides; and f) determining coordinates of the intersecting points based upon the selected pairs of sides.

14. The method of converting polygon data according to claim 12 further comprising a step of clipping certain polygons located outside of a predetermined screen displayable zone prior to said step a).

15. The method of converting polygon data according to claim 12 wherein said step b) further comprises additional steps of converting the intersecting points into a dot data according to a display unit of the screen.

16. The method of converting polygon data according to claim 12 wherein said steps a) b) and c) are repeated for each scan line.

* * * * *